April 7, 1936.  B. SASSEN ET AL  2,036,362
AUTOMATIC PATTERN CONTROLLED MILLING MACHINE
Filed Sept. 20, 1932  8 Sheets-Sheet 1
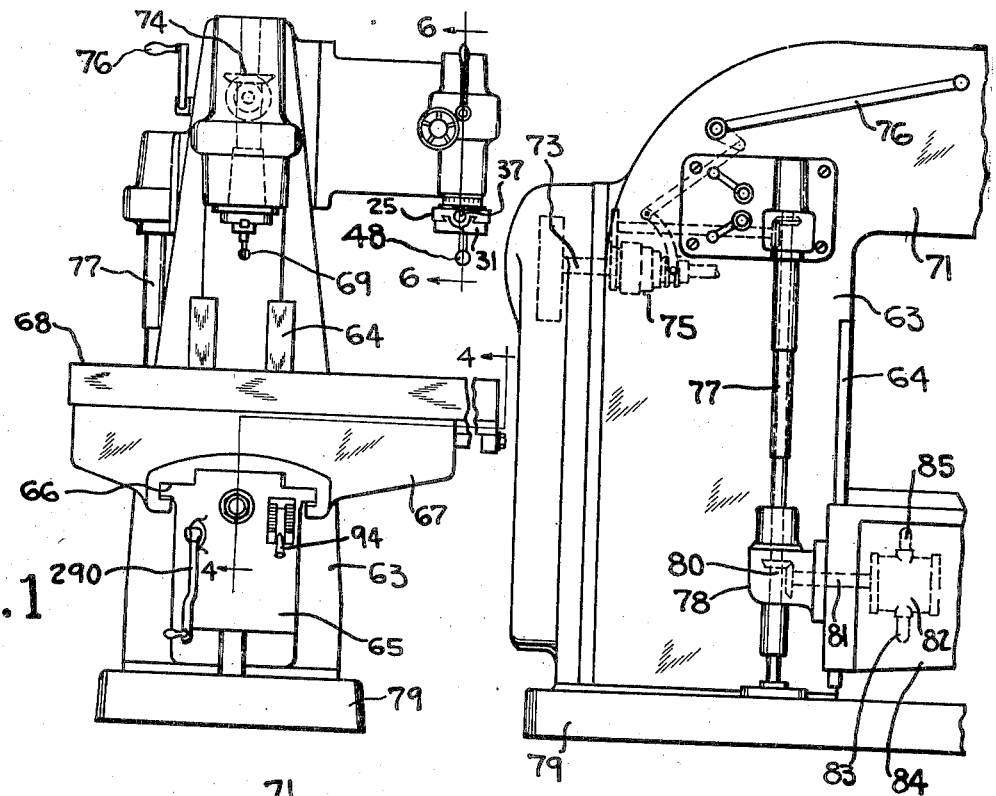
Fig. 1
Fig. 1a
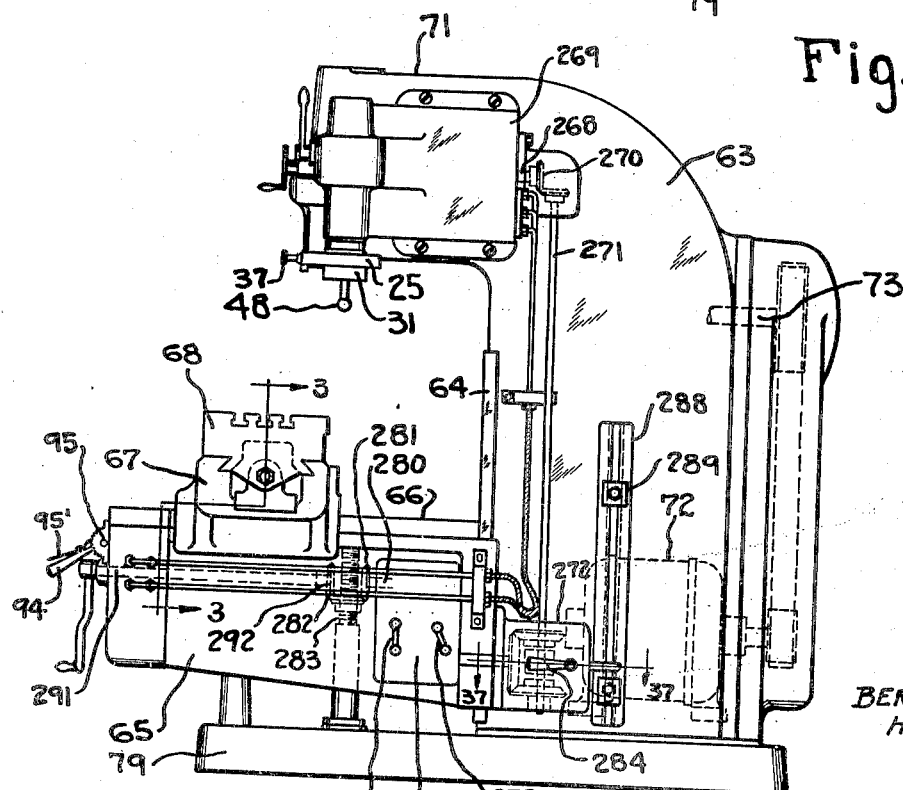
Fig. 2
Inventors
BERNARD SASSEN
HANS ERNST
By H. K. Parsons
Attorney

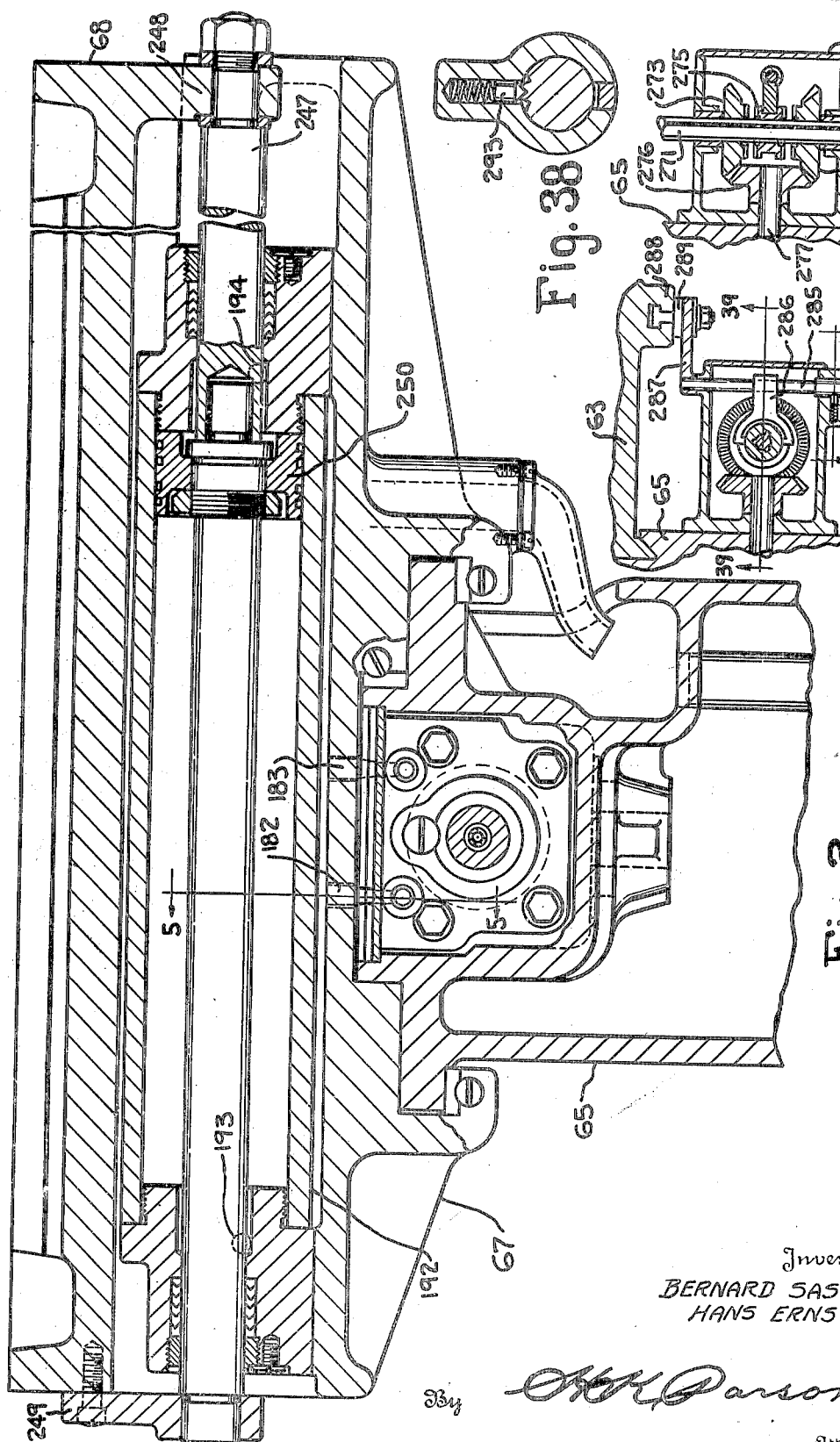

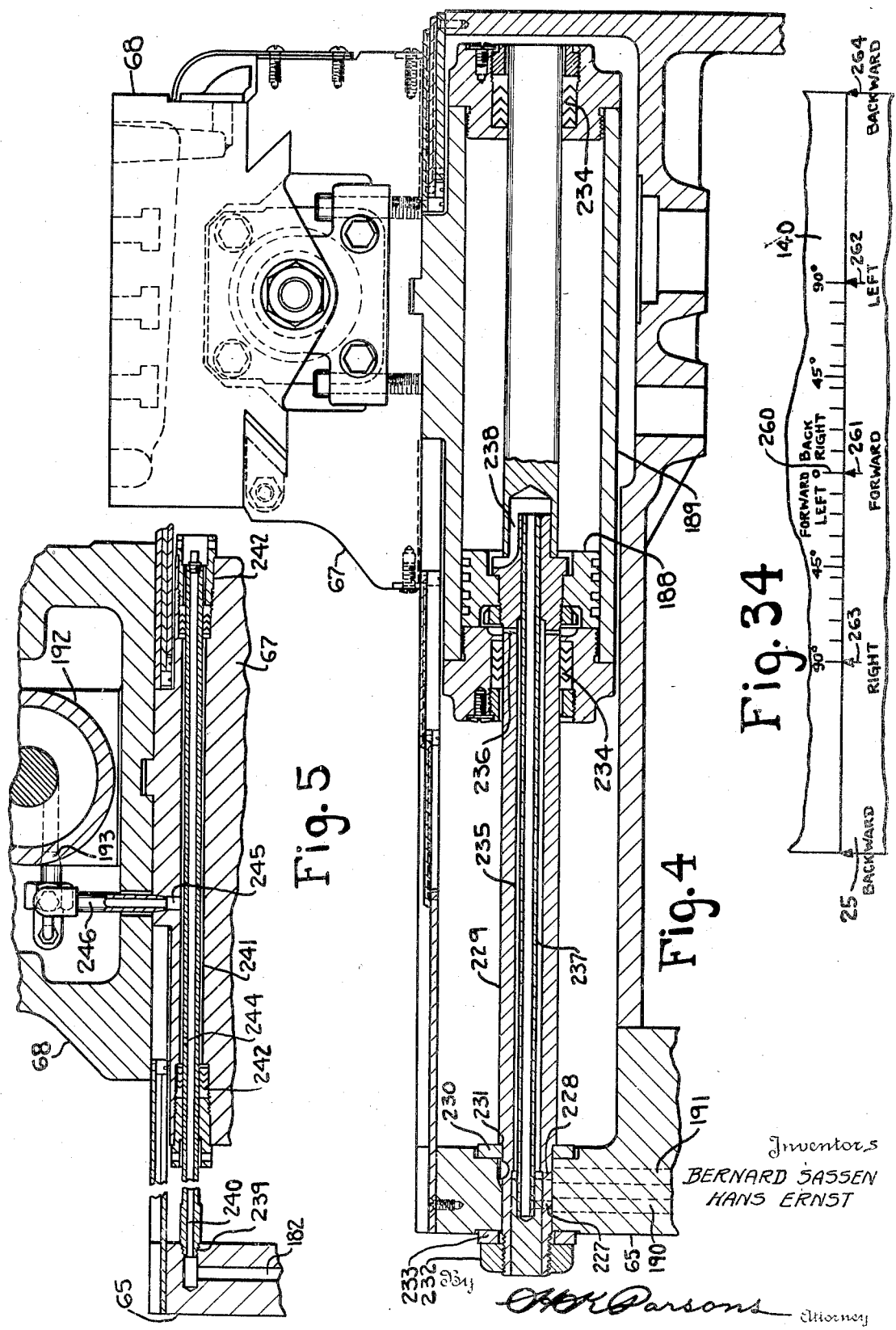

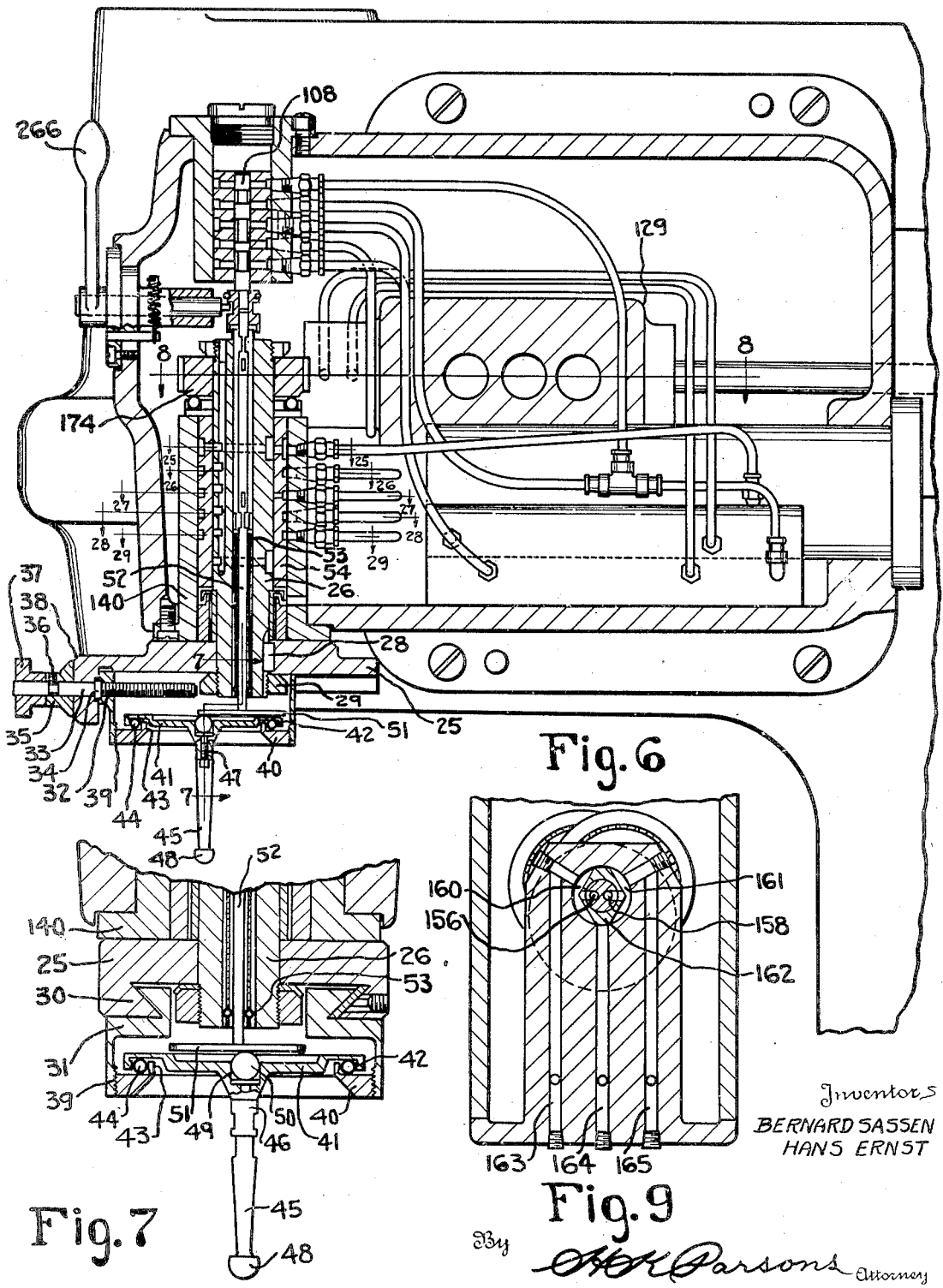

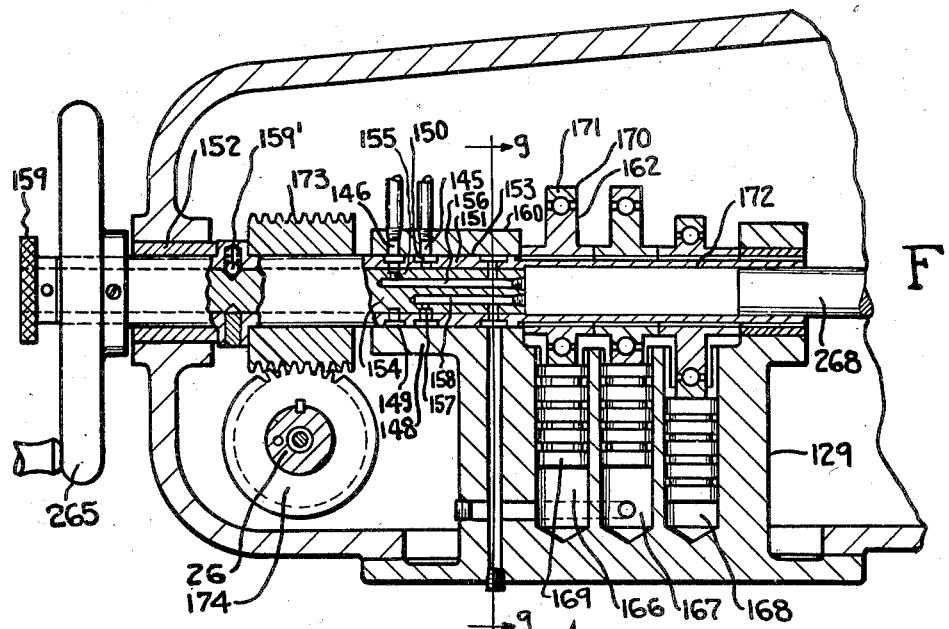

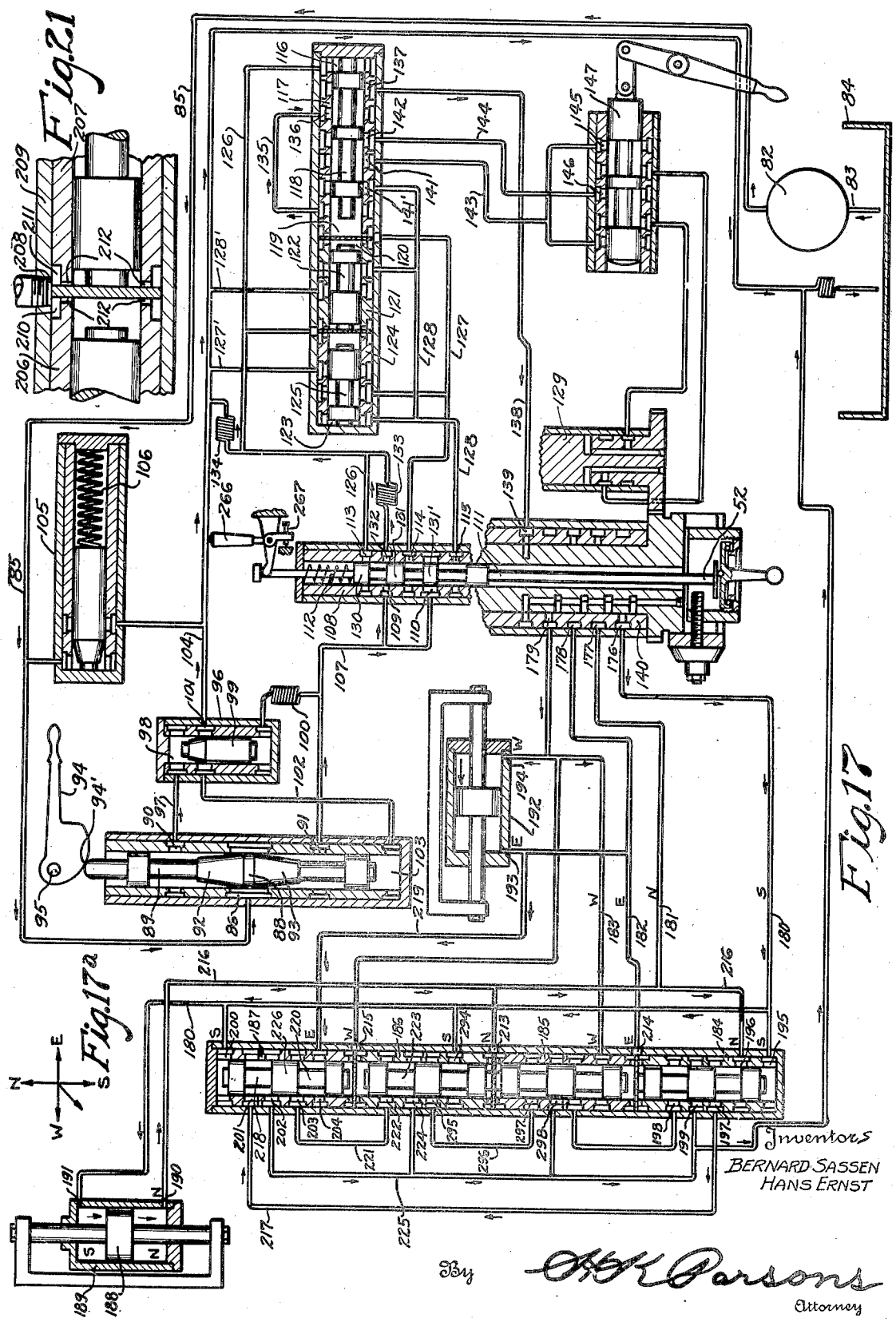

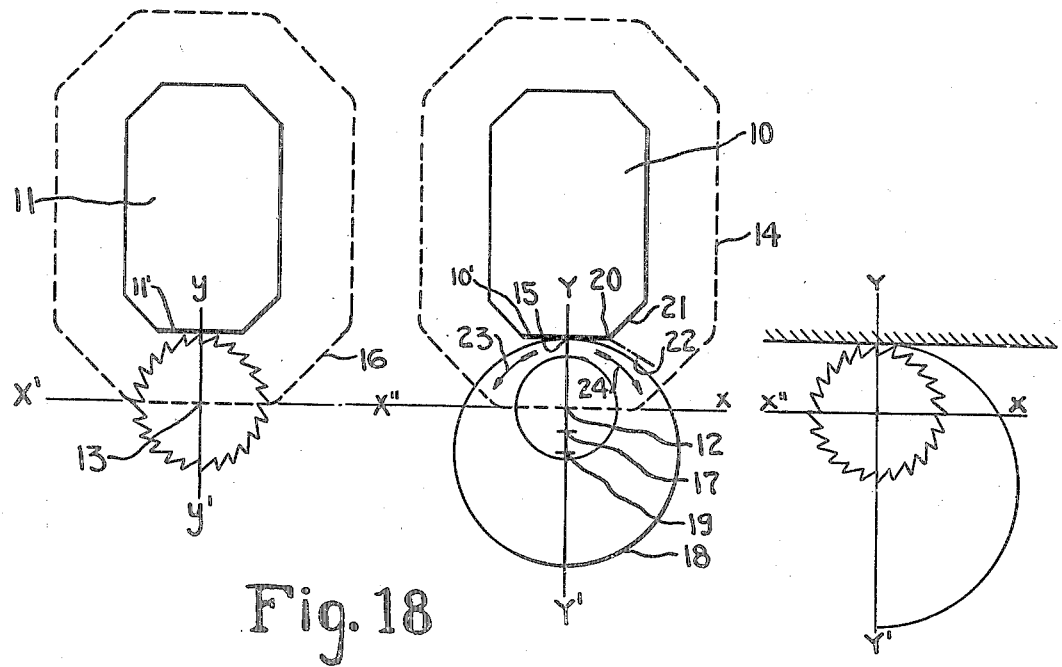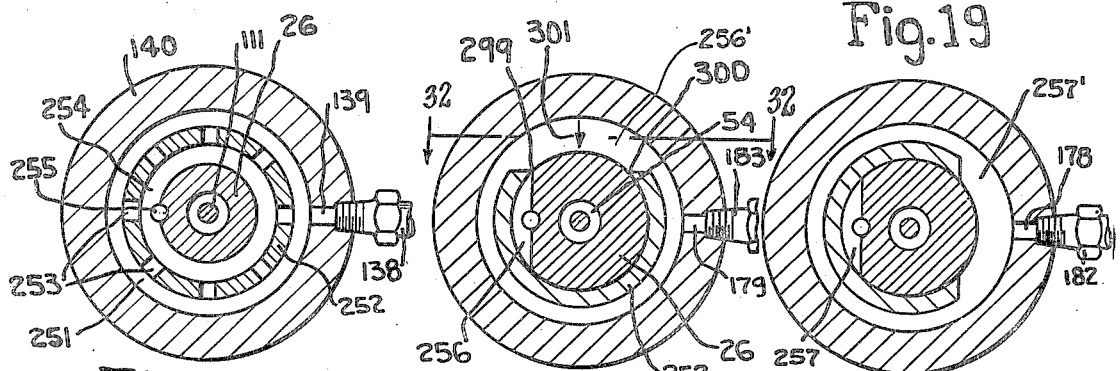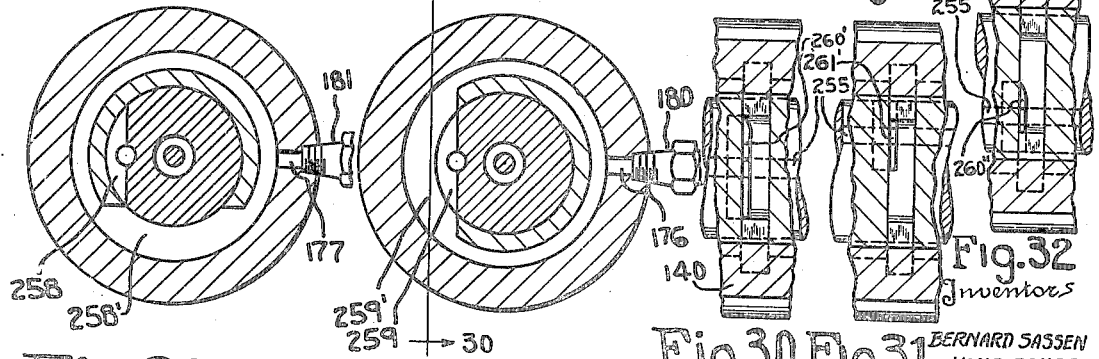

April 7, 1936.   B. SASSEN ET AL   2,036,362
AUTOMATIC PATTERN CONTROLLED MILLING MACHINE
Filed Sept. 20, 1932   8 Sheets-Sheet 8
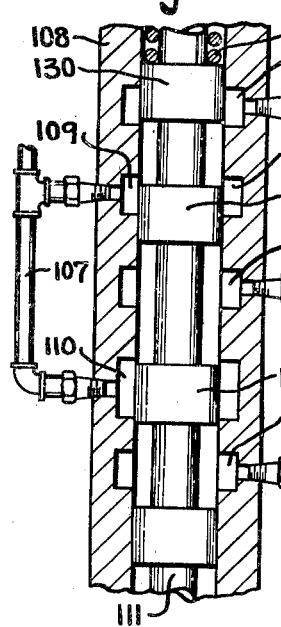
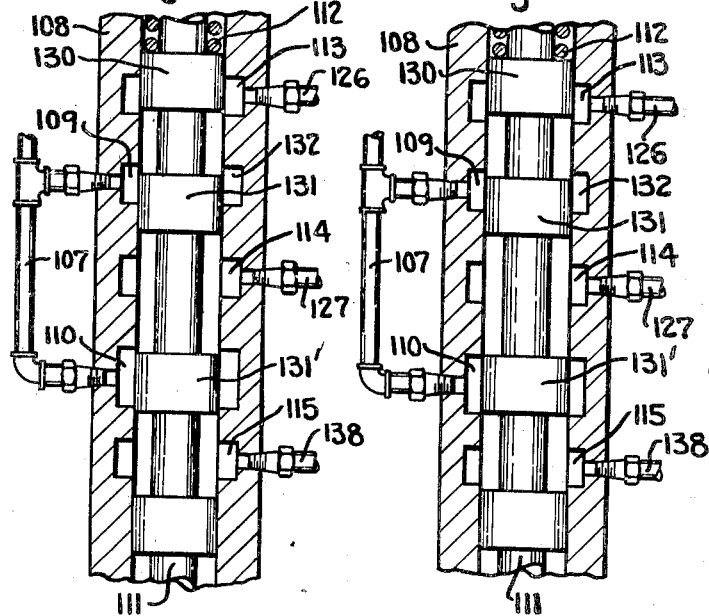
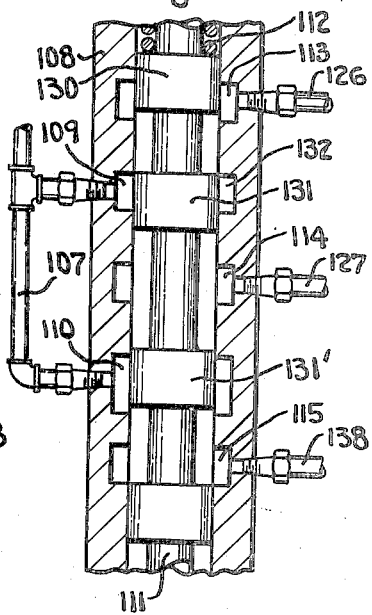
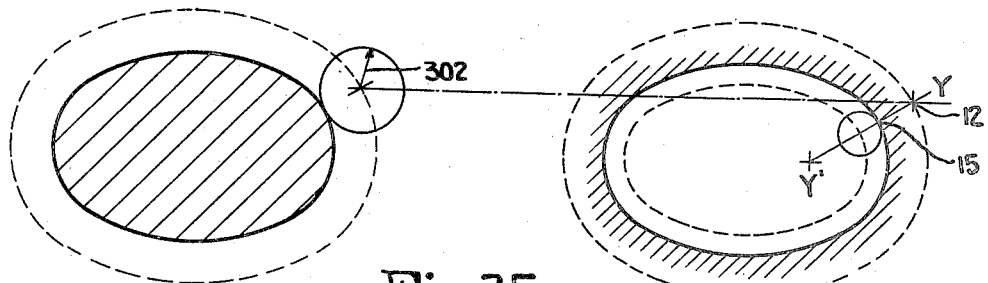
Fig.35
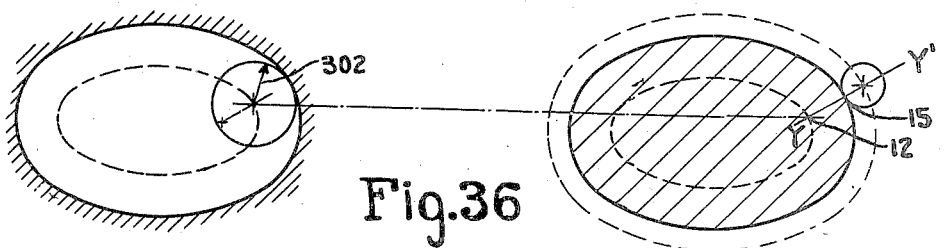
Fig.36
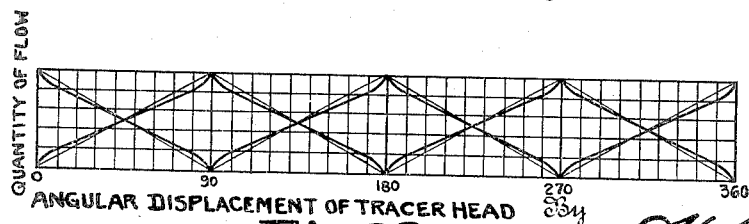
Fig.33
Inventors
BERNARD SASSEN
HANS ERNST
Attorney Patented Apr. 7, 1936

2,036,362

UNITED STATES PATENT OFFICE 2,036,362

AUTOMATIC PATTERN CONTROLLED MILLING MACHINE

Bernard Sassen and Hans Ernst, Cincinnati, Ohio, assignors to The Cincinnati Milling Machine Company, Cincinnati, Ohio, a corporation of Ohio Application September 20, 1932, Serial No. 634,014

30 Claims. (Cl. 90—13.5)

This invention relates to automatic pattern controlled milling machines and more particularly to improved mechanism for maintaining the tracer in contact with the pattern and for transforming tracer movement into relative movement between cutter and work, whereby pattern controlled milling operations heretofore deemed impossible may be successfully and efficiently performed and whereby contours requiring relative angular movement through angles greater or less than a complete circle may be reproduced automatically in a continuous operation.

In automatic pattern controlled machines of the past and more particularly those used for profiling purposes, it has been necessary in operations requiring an angular movement through more than 180 degrees to make directional adjustments usually at the completion of each quadrant of movement in order to insure a constant urge of the tracer toward the pattern and thus maintain the tool in proper position with respect to the work. These adjustments were not effectible automatically thereby necessitating the attention of the operator to make them and although made quickly, yet a new stress condition was created in the machine which sufficiently varied the relation between the cutter and work to cause undesirable marks to be left on the finished surface which had to be removed by subsequent finishing operations.

One of the principal objects of this invention therefore is to provide an automatic pattern controlled milling machine suitable for die-sinking or profiling purposes which will automatically effect a cut through angles as great as 360 degrees or even greater without the necessity of any manual directional adjustments thereby providing a finished surface which is free from undesirable tool marks.

In any type of pattern controlled machine tool it has always been deemed necessary to have the tracer of substantially the same diameter as the cutter in order to insure that each will bear the same relationship to the pattern and work respectively at all times in order to insure faithful reproduction of irregular contours. This results in a certain hardship because it is difficult to maintain the cutter of equal diameter to the tracer, especially where the cutter must be ground periodically to maintain a proper cutting edge. Furthermore, cutters of the exact diameter suitable for the work, or for the size of tracers at hand may not always be available.

Therefore, another object of this invention is to overcome the inadequacies of prior structures by providing greater flexibility in the selection of cutters that may be used with a given diameter of tracer, especially those used in plane profiling and die-sinking operations.

Still another object of this invention is to provide a tracer construction which is adjustable in such a manner that variable stock allowances over the size of the pattern may be left and for such other necessary adjustments as may arise from sharpening the cutter.

Another inadequacy of prior structures is the impossibility of producing a female die directly from a duplicate male pattern, or a male die from a female pattern because the performance of this function would have necessitated the use of a tracer and cutter of zero diameter.

This invention has therefore as one of its objects to overcome this difficulty by providing an improved tracer mechanism that will make possible the formation of a male or female die from its counter part.

An additional object of this invention is to provide a rotary tracer controlled mechanism for determining the direction of relative feed between cutter and work and one which bears such a relationship to the operated parts that a suitable pointer may be incorporated therewith to indicate progressively any change in the direction of resultant movement occurring between cutter and work.

Another important object of this invention is to provide a universal hydraulically actuated pattern controlled milling machine which may be utilized for profiling or die-sinking purposes under either automatic or manual control without the necessity of making special adjustments to the machine for either purpose or method of operation.

Another object of this invention is to provide a machine of the type set forth in which the tracer may be automatically brought into proper operating contact with the pattern without attention on the part of the operator.

A still further object of this invention is to provide an improved method of die-sinking whereby a die may be formed in one continuous cutting operation thereby insuring a high degree of fidelity between pattern and work.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

Figure 1 is a front elevation of a machine embodying the principles of this invention.

Figure 1-A is a side view of the machine as viewed from the left of Figure 1.

Figure 2 is a side elevation of the machine as viewed from the right of Figure 1.

Figure 3 is a section on the line 3—3 of Figure 2.

Figure 4 is a section on the line 4—4 of Figure 1.

Figure 5 is a section on the line 5—5 of Figure 3.

Figure 6 is a section on the line 6—6 of Figure 1.

Figure 7 is a section on the line 7—7 of Figure 6.

Figure 8 is a section on the line 8—8 of Figure 6.

Figure 9 is a section on the line 9—9 of Figure 8.

Figures 10 to 16 inclusive are diagrammatic views showing the various positions of the tracer mechanism during automatic positioning of the tracer into contact with the master.

Figure 17 is a diagram of the hydraulic circuit of the machine.

Figure 17A is a diagram showing orientation of cylinder motors.

Figure 18 is a diagram showing relation between tracer and pattern, and cutter and work.

Figure 19 is a view of a modified form of tracer button.

Figure 20 is a view showing relation of pattern and tracer when turning a corner in the pattern.

Figure 21 is a section showing the dividing wall between balancing valves.

Figures 22, 23 and 24 are views showing the different positions of the distributor valve.

Figures 25 to 29 inclusive are sectional views through the directional control valve taken on the respective section lines in Figure 6.

Figure 30 is a section on the line 30—30 of Figure 29.

Figure 31 is a section similar to Figure 30 but with the valve member turned through an angle of 45 degrees from the position shown in Figure 29.

Figure 32 is a sectional view on the line 32—32 of Figure 26 but with the valve turned through an angle of 45 degrees from that shown in Figure 26.

Figure 33 is a graph showing the relation between angular displacement of the tracer head to the quantity of flow effecting the displacements.

Figure 34 is an expanded view showing the graduations on the tracer head.

Figures 35 and 36 are diagrammatic views showing the relative positions of tracer and cutter for producing male or female parts from their counterparts.

Figure 37 is a section on the line 37—37 of Figure 2.

Figure 38 is a detail of the detent mechanism as viewed on line 38—38 of Figure 37.

Figure 39 is a sectional view on the line 39—39 of Figure 37.

In the art of pattern controlled profiling, diesinking and the like, it is necessary to set up and maintain a fixed relationship between the cutter and tracer in accordance with the relative spacing between the pattern and work, and so connect the tracer with the cutter that deflection of one will cause a corresponding relative adjustment of the other to the end that the pattern will be faithfully reproduced in the work. If this adjustment is accomplished by power means, then that means must be placed under the control of the tracer in such a manner that it will automatically respond to each deflection imparted to the tracer by the pattern. In addition, machines of the automatic type are provided with means for constantly urging the tracer into contact with the pattern in order that it may detect and respond to variations in the contour thereof. In present machines this urge can only be maintained in one direction at a time and thus it is customary to change the direction of this urge manually for each quadrant of operation. If now this urge could always be maintained in a direction perpendicular to the tangent passing through the point of contact between tracer and pattern then this manual adjustment would not be necessary and continuous milling through an angle of 360 degrees or greater could be accomplished without attention on the part of the operator.

One of the important features of this invention is to provide tracer controlled mechanism which will function in such a manner as to maintain substantially this perpendicular relationship automatically throughout a complete orbit of engagement with the pattern, or through angles even greater than 360 degrees. In order that this feature of the invention may be more thoroughly understood, and for the purpose of explanation let it be assumed that a pattern 10 and work piece 11 are mounted in suitable spaced relation as shown diagrammatically in Figure 18, the work piece to be finished to the exact size of the pattern. The center of the cutter is indicated by the reference numeral 13. Let the line Y—Y' be drawn perpendicular to the surface of the pattern through a point 12 which is maintained in fixed relationship with the center of the cutter 13; the line Y—Y' be drawn through the center 13 parallel to the line Y—Y', and the line X—X' be drawn through the points 12 and 13 perpendicular to the line Y—Y'. If the distance from the point 12 to the pattern along line Y—Y' is equal to the radius of the cutter, then the cutter will be tangent to the desired finished surface of the work; or in other words, the distance from the point 12 to the pattern is equal to the distance from the center of the cutter to the work. If now relative movement is produced between the pattern and tracer so that the point 12 moves along the path 14 and the line Y—Y' is maintained perpendicular at all times to the tangent at the point 15, the cutter, if maintained in fixed relationship with the point 12, will follow a path 16, of similar shape to the path 14, and a work piece will be produced having the same outline as the pattern, and of equal dimensions therewith. These dimensions may, however, be made slightly larger or smaller as when providing for finish stock allowance, by making the distance 12—15 slightly smaller or larger respectively than the radius of the cutter.

From this simple diagram it will be seen that the tracer could be a short arm of length 12—15 terminating in a point or knife edge and making point or line contact with the pattern and need not therefore be a circular member of equal diameter with the cutter. Furthermore, if the length of this arm with respect to the center 12 is variable, it will be apparent that this tracer may be used with cutters of different diameter. In order to have power control, however, the tracer must be of such construction that it may be deflected by the pattern in order to provide the necessary agency to influence the power means and for that reason it is general practice to mount the tracer for universal movement.

In the present construction, as previously mentioned, it is not necessary that the tracer button have the same diameter as the cutter but it may be any amount greater than the cutter and in certain cases may be even smaller than the cutter. Also, in the present construction, the tracer need not even be mounted for universal movement; all of which will be explained more fully hereafter. Although the tracer button itself may be of larger diameter than the cutter, its center may nevertheless lie on the line Y—Y' as at the point 17 when undeflected. If the tracer button, represented by the circle 18 for convenience, is now deflected by the pattern its center will move along the line Y—Y' such as to the point 19, and the distance between 17 and 19 will indicate the amount of tracer deflection. This deflection may be considered to be the amount required to move the tracer to a neutral position, and thus make it possible for the tracer to deflect either positively or negatively with respect to this position; otherwise, if the tracer had no initial deflection when in contact with the pattern, it could only respond to departures in the pattern surface which were toward the tracer as represented by the line 22 in Figure 18 and not those which receded therefrom as represented by the line 21.

It is also apparent from this diagram that the only thing that can change the amount of deflection of the tracer button would be a departure of the pattern surface from parallelism with the line X—X'. For instance, when the point of contact 15 has moved to the corner 20 of the pattern the tracer, if properly urged toward the pattern, will be undeflected, or in other words will be moved slightly toward the center of the pattern. The point of tangency would then lie on the inclined face 21 in which case the line Y—Y' would not at that instant be perpendicular to this face. In other words, a deflection of the tracer either toward or away from the pattern may be said to break momentarily the perpendicular relationship of the line Y—Y' with respect to the pattern. Also, due to the continued movement of the point 17 in a direction parallel to the line X—X', the distance between 17 and point of tangency would be greater than before and the distance between 17 and 19 which is the tracer deflection will thus be decreased. This decrease in tracer deflection is utilized to re-establish the required perpendicular relationship so that the center of the cutter 13 will properly follow the path 16. One way that this can be brought about is to mount the tracer button in a rotary tracer head having its axis at the point 12 and then rotating the tracer head until the line Y—Y' realigns itself perpendicular to the surface 21. It is thus apparent that means must be provided for rotating the tracer head and furthermore that the direction of this rotation must depend upon whether the new path of travel is in a direction such as the line 21, which will cause what will be herein known as undeflection of the tracer, or whether it is in the direction of a surface, such as 22, which would cause what will herein be termed as increased deflection of the tracer. If a surface, such as 21, causes undeflection of the tracer, the tracer head must be rotated in a counter-clockwise direction, or in other words in a direction indicated by the arrow 23, while if a surface, such as 22, causes increased deflection, the head must be rotated in the opposite direction, or in other words in a direction indicated by the arrow 24. Control means have therefore been provided whereby a deflection of the tracer will influence a suitable power means to effect rotation of the tracer head so that for each undeflection or increased deflection of the tracer button, the line Y—Y' will be realigned perpendicular to the new surface and maintained perpendicular thereto because it should now be obvious that it is only by maintaining this perpendicular relationship that true reproduction results can be accomplished with a tracer button of unequal diameter to the cutter.

If the cutter and tracer head are rotatable about fixed axes, means must be provided for effecting movement of the work and pattern relative to these fixed axes in order that the entire periphery of the work may be finished. In other words, a relative feeding movement must be provided for, and if the line Y—Y' is maintained perpendicular to the tangent of the pattern at the point of contact with the tracer, the feeding movement will always be in a direction at right angles to this line, or in other words along the line X—X'' as respects the pattern and X''—X' as respects the work. For this reason the line X—X'' may be utilized throughout these diagrams to indicate the direction of feed while the line Y—Y' will always point toward the pattern during normal operation of the machine and be perpendicular to the tangent at the point of contact between the pattern and tracer.

Since it is thus necessary to continually change the resultant direction of feed in accordance with the pattern, power means have been provided herein under control of the tracer for determining rotation of the tracer head and actuation of a pair of slides relatively movable at right angles to one another whereby they may be moved at such relative velocities that the desired resultant feed direction will be obtained. The latter may be accomplished by means of a rotatable power control member which is so connected to the slides that each angularly adjusted position thereof will effect a feed movement in a predetermined direction. This member bears such a relationship to the tracer control mechanism that the resultant relative movement effected thereby will be in a line parallel to the line X—X'.

From the foregoing it will be seen that a new principle of pattern controlling the position of a cutter is contemplated in which a tracer button which may be of different diameter than the cutter is utilized for scanning the pattern surface, the tracer button being eccentrically mounted for bodily rotation about an axis located intermediate its own center and the point of tangency with the pattern so that a line connecting this axis to the point of tangency may be maintained substantially perpendicular to a tangent of the pattern at the point of contact with the tracer button.

Absolutely accurate results, however, cannot be obtained if the center of the tracer button is positioned on the line Y—Y' in alignment with the point 12, as shown in Figure 18, because an additional deflection is imparted to the tracer upon rotation of the head in addition to the normal deflection imparted thereto by the pattern itself. The effect produced by this rotation is the same as if the radial arm 12—15 were lengthened and it is this lengthening that causes increased deflection of the tracer. On account of this, the tracer button can never return to its neutral position and therefore the feed movement which was stopped cannot be reinitiated. It should therefore be obvious that the tracer button must either be so formed or so positioned that this inoperative condition does not occur. It has been overcome in the present instance by slightly offsetting the center of the tracer button laterally of the axis Y—Y' as more particularly shown in Figure 16. In this figure it will be noted that the center 17 of the tracer button lies on the axis Y2—Y3 and the center 12 of the tracer head still lies on the axis Y—Y'. The amount of lateral offset is greatly exaggerated in this figure, but as a matter of fact it is only a few thousandths of an inch. It will also be noted that this lateral offset is on the advance side of the axis Y—Y' or, in other words, on the side toward which the direction of feed occurs. Careful observation of Figure 16 will disclose the fact that when the point 17 is rotated in a clockwise direction about the center 12 that the point 17 will actually move through space in a direction away from the surface of the pattern and therefore the end 15' of the radius 17—15' which lies on the axis Y2—Y3 will actually move away from the pattern surface. Although the amount of this movement is comparatively small, it is sufficient to correct for the apparent elongation of the radial arm 17—15, Figure 18, and produce a situation in which the radial arm will have the same length irrespective of rotation of the button. Attention is invited to the fact that even although the axis Y2—Y3 is laterally displaced with respect to the axis Y—Y' the power urge of the tracer mechanism toward the pattern is still substantially perpendicular to the tangent drawn through the point of contact.

It will also be noted that the distance between the center of the tracer button when undeflected and the axis of the tracer head could be fixed but it is preferable for reasons set forth herein that they be relatively adjustable with respect to one another. One form that this adjustable mounting might take is illustrated in Figures 6 and 7. As shown, the tracer head 25 is secured to the end of the rotatable member 26 which has keyed or otherwise secured to its upper end the operating gear 27. A key 28 and lock nut 29 may be utilized for securing the parts together for joint rotation. The head 25 is provided with a dove-tail guideway 30, the center of which it will be noted intersects the axis of the rotatable member 26, as more particularly shown in Figure 7. A tracer body 31 is slidably mounted in this guideway and has a threaded aperture 32 in one end for receiving an adjusting screw 33. This screw is held against axial movement in the member 25 by means of a collar 34 engaging one face of the tracer body and a dial 35 secured to the adjusting screw by a set screw 36. Rotation of the adjusting screw is effected by an operating knob 37 secured to the outer end thereof, and the dial cooperates with a fixed mark 38 on the body, the graduations being such as to permit micrometer adjustment of the tracer body.

The lower end of the tracer body has a circular threaded opening 39 in which is mounted a reaction ring 40 for supporting a collar button shaped member 41 having a depending annular flange 42. The ring 40 has an upstanding flange 43, the outer surface of which is parallel to the inner surface of the flange 42 and anti-friction members such as the balls 44 may be mounted between the two flanges to insure movement between the parts with the least amount of friction.

A button shaped portion 45 of member 41 is secured to the end of the shank 46 by means of the lock bolt 47. The shank projects from the center of the member 41 which thereby positions the tracer button 48 exactly in the center of the reaction ring 40. A depression 49 is formed in the center of the top surface of the member 41 for receiving ball 50 which makes point contact with a disk 51 attached to the end of the vertically reciprocable rod or tracer arm 52. This rod is mounted in anti-friction bearings 53 in the central bore 54 of the rotatable member 26. The tracer arm 52 is operatively connected at the upper end to a power control mechanism to be described later for controlling the rotation of the tracer head and the feed rate of the work relative to the cutter.

The tracer button and its support are so mounted that axial pressure on the button will effect axial movement of the member 41 which will be accurately guided by the anti-friction members 44 and it in turn through the ball 50 and flange or disk 51 will cause vertical reciprocation of the tracer arm 52. Likewise, a radial pressure on the button 48 will cause the member 41 to pivot about a point on its periphery which in turn will cause an elevation of the ball 50 and disk 51 and thereby a similar axial movement of the tracer arm 52. It will thus be noticed that either an axial or a radial thrust on the member 45 will result in axial movement of the tracer arm and thereby actuation of the power control mechanism.

The advantage of this eccentric adjusting mechanism is that it permits the distance between the center of the tracer head 25 and the axis of the tracer button 48 to be varied relative to one another so that if the diameter of the cutter is changed either by the use of a new cutter or due to the fact that the present cutter has been slightly reduced in diameter due to sharpening or grinding thereof, the tracer button may be re-adjusted to insure that the distance from the center of the tracer head to the pattern contacting surface of the button is equal to the radius of the cutter. It also permits this surface of the button to be positioned at a distance which is slightly greater or less than the radius of the cutter so a slight amount of stock may be left on the work for subsequent finishing operations over the true size of the pattern.

Another important use of this adjusting mechanism, however, is in the production of punches and dies and especially where it is desired to cut a punch from the pattern of the die with which it is to be used, or vice versa. In such a case, it is only necessary to provide one pattern from which both a duplicate and its counterpart may be formed constituting for instance a punch and corresponding female die member. In making this adjustment, provision may also be made for whatever clearance is desired between the two parts when they are in use such as in metal forming operations.

Due to the unique construction of the tracer mechanism the tracer button itself may be given various shapes. Ordinarily, these heads would be circular because they are the easiest to manufacture although certain advantages arise from using the semicircular shapes, shown in Figure 19. The tracer heads should have an arcuate surface however, of at least an angle of 90 degrees and preferably slightly more in order to insure proper reproduction of internal corners.

For instance, as shown in Figure 20, when the tracer button indicated by the reference numeral 55 traveling in the direction of the arrow 56 contacts the side wall 57 of a pattern the cutter 58, which has been superimposed hereon to show the relative relation between the movement of the tracer and cutter, if larger than the tracer button 55, will overrun beyond the intended surface 57 before the tracer can come into action to check its movement. While if a cutter such as 57' and smaller than the tracer is used it will be apparent that the periphery of the tracer will engage the wall before the cutter engages the corresponding wall on the work. If the tracer is intended to have an initial deflection before reaching an operating position, such as the distance 59 in Figure 20, it will be apparent that the tracer button should have a radius at least this much greater than the cutter in order to insure that this initial deflection may take place before the cutter engages the work. It will therefore be seen that for many types of work it will be necessary to have the tracer button larger than the diameter of the cutter by the amount set forth. If the type of work is comparatively flat or convex, this may not be necessary and cutters larger in diameter than the tracer button may be utilized.

Having chosen a suitable type of tracer button, it is secured to the end of the tracer mechanism by screwing the threaded end 47 of the tracer in a threaded socket formed in the end of member 41 and it is now ready to establish contact with the pattern. As previously mentioned, this contact is established automatically, the operator merely positioning the tracer head so that the line X—X' points toward the pattern and starting the machine. The manner in which this contact is automatically established is illustrated diagrammatically in Figures 10 to 16 inclusive. The manner of establishing contact is the same irrespective of the relative position of the tracer button with respect to the axis of the tracer head and generally irrespective of the type of tracer button utilized.

Attention is invited to the fact, at this point, that the power means controlled by the tracer mechanism for effecting rotation of the tracer head and the feeding of the work is so arranged that during increase in tracer deflection, the rate of rotation of the tracer head will decrease from a maximum to zero, while at the same time the feed rate will be increased from zero to maximum. This condition will exist between a certain minimum tracer deflection and a predetermined intermediate amount of tracer deflection, the last named position being termed herein the neutral position. At this position the feed rate will be a maximum and the rate of rotation of the tracer head will be zero. Further deflection of the tracer beyond this point to a position herein termed the safety position will find the feed rate decreased from a maximum to zero and the rate of rotation of the tracer head increased from zero to maximum. Further deflection of the tracer beyond the safety position will effect no change, that is, the feed rate will still remain at zero while the tracer will be rotating at its maximum rate. Attention is also invited to the fact that at the neutral position when the rate of rotation of the tracer head passes through zero, its direction of rotation changes upon subsequent increase in rate.

When the tracer button is free of the pattern, the power control means will be so positioned that when the machine is started the feed rate will be at a maximum and the power will be disconnected from the tracer head. As previously explained in connection with Figure 18, the axis X—X' indicates the direction of relative feeding movement between the pattern and tracer as well as between the cutter and work and the axis Y—Y' will point toward the pattern when in a normal operating position. Since it is necessary first to effect contact between the pattern and tracer, the tracer head will be positioned so that the axis X—X' points toward the pattern as shown in Figure 10 so when the machine is started the tracer will approach the pattern. In Figure 10 the reference numeral 18 indicates the tracer button while the intersection of the rectangular coordinate axes is indicated by the reference numeral 12 which intersection is also the center of rotation of the tracer head. For the purpose of convenience in illustration, the cutter 13' is superimposed on the diagram, its axis also lying at the point 12 in order to show more conveniently the relative position of the tracer and cutter with respect to the pattern and work. The center of the tracer button when in a free position is indicated by the point 17.

After the machine is started the maximum feed rate will continue until the tracer 18 contacts the pattern at the point 15 as shown in Figure 10. Continued movement in the direction X will cause the tracer button to be deflected from its free position to the position 19 as shown in Figure 11, the amount of this deflection being represented by the distance 60. This distance has been greatly exaggerated for the purpose of explanation, but as a practical matter it is only a few thousandths of an inch. After this first deflection which will be a predetermined amount the tracer will reach the engagement position, at which time the tracer arm will have influenced the power means in such a way that the feed rate is immediately reduced to zero, and the rotation of the tracer head in one direction is immediately established at a maximum rate. If it is intended to scan the pattern in a direction indicated by the arrow 61 in Figure 10, it will be evident from the description of Figure 18 that the axis X—X' must be readjusted parallel to the arrow 61 in order that feed movement will progress in that direction.

The power means will therefore be connected to the tracer head to cause rotation thereof in a counter-clockwise direction. Rotation in this direction will actually cause relative movement or deflection of the tracer button in the opposite direction and the point 19 will move further away from the point 17 indicating further deflection of the tracer, even although the feed rate is substantially at zero. This further deflection of the tracer will so influence the power means as to cause an increase or acceleration in the feed rate and a deceleration in the rate of rotation of the tracer head. The result of these two movements, however, will be a further deflection of the tracer to a neutral position which is indicated in Figure 12. This will so affect the power control means that the feed rate will be increased to a maximum and the rotation of the tracer will be decreased to zero.

Since the feed rate is continuing, further deflection of the tracer will follow and as the neutral position is reached and passed, the rotation of the tracer head will begin to accelerate, but in a reverse direction as indicated by the arrow 62 in Figure 13. In this condition the feed rate will be decreasing and the rate of rotation of the tracer will be increasing, one tending to cause undeflection of the tracer and the other tending to increase the deflection of the tracer and each force will thus alternately prevail over the other until a position such as shown in Figure 15 has been reached. In other words, there are two agencies taking place at the same time, one tending to increase and the other tending to decrease the tracer deflection. A condition of equilibrium will therefore be brought about made up of a combination of these two agencies.

The resultant movement will consist partially of feed rate and partially of clockwise rotation and the point 12 will therefore approach the master more and more obliquely and the parts will pass through the successive positions indicated by Figures 14 and 15 until the line X—X' becomes substantially parallel to the surface of the pattern as indicated in Figure 16. At this point if the rotation were to continue, then the resultant feed movement would bring about a decrease in the deflection of the tracer button because its direction would be divergent with respect to the pattern. Such a decrease in deflection would, however, tend to decrease the rate of rotation of the tracer to zero and increase the feed rate, the tracer returning to the neutral position. Once the tracer is in the neutral position if the profile is straight, the feed rate will be at its maximum and the tracer head will be stationary. From this position on, the action will be the same as that described in connection with Figure 18.

From this it will be seen that the tracer will move into engagement with the pattern and automatically position the cutter in contact with the work without over-running and without attention on the part of the operator. The power means utilized to effect rotation of the tracer head and the feeding of the work will now be described. This power means as well as the control means therefore may be of any suitable type, such as electric, hydraulic or mechanical. A machine embodying one form, such as hydraulic, is shown herein which may be structurally composed as follows:

An upright column 63 is provided which has guideways 64 formed on its front face for supporting a vertically movable knee structure 65. The knee has a horizontal guideway 66 formed on its upper face for supporting a saddle 67 which is movable in a horizontal plane toward and from the column for supporting a table 68 for movement transversely thereof. The table is, in this instance, adapted to support the work and pattern in cooperative relation to a cutter 69 and a tracer 48 supported on the over-hanging arm 71 formed integral with the top of the column 63. Since the cutter and tracer are substantially stationary, the three movements necessary for die-sinking and profiling purposes are imparted to the work and pattern, although it will be apparent that one or more of these movements may be imparted to the tracer and cutter and is so included within the scope of this invention.

A prime mover, such as an electric motor 72, is mounted in the base of the machine for rotating a primary shaft 73 journaled in the column. A suitable variable speed transmission not shown extends from the shaft 73 to a pair of bevel gears 74 journaled in the head 71 for rotating the spindle and cutter at selective speeds. This variable speed transmission is adapted to be connected to the shaft 73 by a clutch member 75 operated by a manual control lever 76 journaled on the side of the column as shown in Figure 1. A vertical splined shaft 77 is journaled in the side of the column and operatively connected to the prime mover through clutch 75. This shaft extends downward, through a bracket 78 projecting from the rear of the knee, and continues into the pedestal 79 of the column for actuating a centrifugal pump which may be used to supply coolant to the cutter.

The bracket 78 contains a pair of bevel gears 80, one of which is splined to shaft 77 for driving a horizontal shaft 81 which is operatively connected to the pump 82. This pump supplies fluid under pressure for operation of the hydraulically actuated mechanism utilized for feeding the work and rotating the tracer head. This pump may be of the constant displacement type, in which case a double throttle feed control valve is associated therewith to vary the feed rate, or it may be a variable displacement pump, the feed rate then being varied directly by varying the delivery of the pump.

The pump 82 has an intake pipe 83 through which fluid is withdrawn from a reservoir 84 located in the bottom of the knee for delivery through pipe 85 to the pressure port 86 located in the double throttle valve indicated generally by the reference numeral 87 in Figure 17. The pressure port 86 is considerably wider than the spool 88 of the valve plunger 89 whereby fluid entering the valve will be divided by the spool, a portion flowing through distributor port 91 and the remainder discharging through distributor port 90. The spool 88 is cylindrical in form and the opposite ends 92 and 93 are tapered to form initial hydraulic resistances at the port 86. If the hydraulic resistances are equal, the flow will be equally divided. The plunger 89 may be longitudinally adjusted in the valve housing as by means of the cam 94' on lever 94 pivotally mounted at 95 on the front part of the machine as shown in Figures 1 and 2, and a clasp lever 95' is provided for holding the cam and thereby the valve in any adjusted position.

A balancing valve 96 is associated with the double throttle valve to maintain the division of flow as determined by the position of the valve spool 88 as more fully explained in copending application of Ernst and Sassen, Serial Number 490,154, filed October 21, 1930.

The port 90 is connected by channel 97 to the end 98 of the balancing valve which has a tapered reciprocable plunger 99. The other port 91 is connected to the opposite end of the balancing valve through a hydraulic resistance 100 which may be a coil of copper tubing so that fluid pressure will act on the end of the plunger 99 to urge the same in a position to close the port 101. As this port closes, the pressure rises in the end 98 of the balancing valve and will continue to rise until the pressure in both ends are equal. This will insure that the pressures at ports 90 and 91 are equal and if the pressures are equal, then the division of flow will be in accordance to that established by the setting of the throttle valve.

A branch line 102 is also connected to the end 98 of the balancing valve for supplying a small amount of pressure fluid to the end 103 of the double throttle valve to thereby maintain the same in contact with the cam 94 of the adjusting lever. The double throttle valve functions to determine the feed rate of the movable slides of the machine and is therefore constructed in the manner set forth to divert part of the fluid from the pump 82 to reservoir in order to reduce the flow to the slides. The port 101 has channel 104 connected thereto for conducting the diverted fluid to the reservoir 84.

An emergency relief valve 105 is interposed between the incoming line 85 and the return line 104 whereby the valve will open against the compression of spring 106 to relieve excessive high pressure in the system and prevent damage thereto.

The fluid utilized for power purposes is conducted from port 91 through a channel 107 to the power control element which in this case is in the form of a distributor valve 108, Figures 17, 22, 23 and 24. This valve is provided with pressure ports 109 and 110 to which the line 107 is connected. This valve has reciprocably mounted therein a plunger 111 which is operatively coupled to the tracer arm 52 previously described whereby deflection of the tracer will effect reciprocation of the plunger. A spring 112 is mounted in the upper end of the valve housing for maintaining the plunger in a downward position and in turn tending to maintain the tracer button in a vertical or undeflected position.

This valve is provided with additional ports 113, 114 and 115, the port 113 being connected by line 126 to the end 116 of balancing valve 117 having valve plunger 118; the port 114 being connected by line 127 to the end 119 of the valve 117 and also the end 120 of balancing valve 121 having reciprocable plunger 122; and the port 115 being connected by line 128 to the end 123 of balancing valve 124 having reciprocable plunger 125 mounted therein. The port 113 and connected line 126 is utilized normally to supply the operating fluid to effect actuation of the work supporting slides and thereby effect the feed movement; while the ports 114 and 115 are utilized for supplying fluid to the hydraulic motor 129, more particularly shown in Figure 8, for effecting rotation of the tracer head.

When the valve plunger 111 is in a position corresponding to the free position of the tracer button, the spool 130 will close the port 113 thereby preventing fluid entering pressure port 109, which is slightly open by spool 131, from flowing to channel 126, but the annular groove 132 of this port still permits a flow through hydraulic resistance 133 unaffected by the position of spool 131. This flow is of the nature of a slight leakage into line 126 in order to maintain a nominal pressure therein, there also being a slight leakage out of this line through hydraulic resistance 134. These hydraulic resistances, which may be in the form of small copper tubing, cause a certain pressure drop to occur across each one thereby maintaining a high pressure in the line 107 and a nominal pressure in line 126. The spool 131' is in such a position that the port 110 will be coupled to port 114 permitting pressure flow to line 127 which, after passing to the end 120 of valve 121 and through the end 119 of balancing valve 117, will be connected by channel 135 to port 136 of the balancing valve 117. The pressure at 119 acting on the end of valve 117 will shift the plunger to the right as shown in Figure 17 thereby coupling the port 136 to port 137 through which the fluid will continue to port 139 of the directional control valve 140 by means of channel 138 effecting actuation of the slides in a manner to be explained hereafter. The valve 117 has a pair of additional ports 141 and 142 which are connected respectively by channels 143 and 144 to ports 145 and 146 of the reversing valve 147 of the hydraulic motor.

Each of these balancing valves is mounted in a separate sleeve, the sleeves being mounted in a common valve housing and each sleeve is separated by means of the construction shown in Figure 21. As there shown, a thin plate 205 is inserted between the end of valve sleeves 206 and 207 and a port 208 is formed in the valve housing such as 209, the port being of sufficient width to communicate with the grooves 210 and 211 formed in the end of the opposed sleeves, the ends of these sleeves also having radial grooves such as 212 which permit the fluid to flow from the annular grooves to the interior of the sleeve to admit or exhaust fluid from the ends of the respective valves. If fluid is admitted through a port such as 208, equal pressure will be exerted on both ends of the respective valves tending to shift the same in opposite directions, while if the port 208 is connected to exhaust, the respective pistons will move in the opposite directions when pressure is exerted upon the opposite ends of either or both.

The shifting of valve spool 122 to the left upon the admission of pressure to the end 120 of the cylinder 121 due to flow in line 127 will cause the fluid in the opposite end of the cylinder to be forced out due to the lower pressure in line 126; and this fluid will be forced into the forward end of cylinder 124 thereby shifting the spool 125 thereof to the left. It will thus be seen that in the free position of the tracer that all the fluid will be delivered to channel 138 to effect feed movement of the slides at the maximum rate. The flow from line 127 to channel 138 to effect this feed movement only occurs when the tracer is in a free positon, as in all other positions the flow in channel 127 is utilized as before described to effect operation of the tracer head motor.

Upon relative approach between pattern and tracer to establish contact, the feed movement will continue until the tracer has been deflected to the engagement position previously mentioned. This will cause upward movement of the plunger 108 to the position shown in Figure 22 and from that figure it will be noticed that the spool 130 has been moved upward to a position such that the port 113 has opened just the slightest amount to permit a slight flow therethrough. Also that the spool 131' has moved upward to close almost the port 110 and thus stop the flow to channel 127. As soon as fluid begins to flow through port 113 and channel 126, pressure will build up in the end 116 of valve 117 shifting the plunger 118 thereof all the way to the left.

The moment this plunger shifts, port 137 will be disconnected from port 136, and connected to channel 126 which will then supply the fluid to the work supporting slides. Although this flow through port 113 at the beginning is a limited flow, it will be seen that the work slides have been suddenly disconnected from a full flow at maximum rate to a small flow corresponding to a minimum rate. At the same time the shifting of plunger 118 to the left couples port 136 to port 142, fluid flowing through channel 144 to cause rotation of the tracer head at its maximum rate. Since fluid is being supplied to the tracer head motor through channel 144, the opposite channel 143 will be connected to reservoir through coupling of ports 141 and 141', and since the valve spool 122 is still in a left hand position, the channel 128 will be connected by means of the annular groove in plunger 122 to the branch return line 128'. From this it will be seen that in the engagement position the tracer head will be rotating at a maximum rate and the work supporting slides will be moving at a minimum rate.

As the deflection of the tracer increases, the valve plunger 108 will gradually move upward further opening port 113 and closing port 110 to thereby increase the feed rate and decrease the rate of rotation of the tracer head. This condition will continue until the valve reaches the position shown in Figure 23 at which time the ports 109 and 113 will be opened an equal amount permitting a maximum flow to the operating slides, and the spool 131' will be in a position exactly central of port 110. Since the spool and the annular groove of this port are the same width the port will be substantially closed and any leakage will be the same on either side thereof which will not effect movement of the rotary head. This position is known as the neutral position and it will now be noted that a slight shifting of the valve plunger 108 in either direction from this position will connect the port 110 with either port 114 or 115 to cause rotation of the tracer head in one direction or the other, accompanied by a decrease in the feed rate.

In Figure 24 the valve is shown in its extreme upward position corresponding to maximum deflection of the tracer, and it will be noted from this figure that the port 110 is connected to the port 115 which will now cause a greater pressure in the end 123 of valve 125 than in the opposite end, thereby connecting the channel 127 to the branch return line 127' permitting the motor to exhaust through channel 144 while the line 128 will be connected through ports 141' and 141 to channel 143 thus causing reverse rotation of the tracer head. It will be noted that when fluid is supplied to the tracer head motor through either one of channels 144 or 143, that the other channel is connected to reservoir thru the respective balancing valves 122 and 125. For instance, when fluid is supplied to channel 144, the return flow passes through balancing valve 122, one end of this valve being subjected to the pressure of the feed line 126 and the opposite end being subjected to the forward pressure of the tracer head motor. Since the work resistance of the tracer head motor is very low compared to the work resistance of the operating slides, the balancing valve will take up a position almost closing the port to the branch return line thereby building up an additional work resistance which will be reflected in the pressure existing at the end 128 of the valve and causing this pressure to balance the pressure on the opposite end. The valve will assume a floating condition during actual operation of the machine. When the forward pressure is in channel 143, then this balancing effect is assumed by plunger 125 which in turn will balance the pressure in line 128 against the feed pressure in line 126 and maintain these pressures equal irrespective of variations in the work resistances. From the foregoing it should now be apparent that a power means has been provided under the control of the tracer for effecting automatic rotation of the tracer head and the distribution of power to the various work slides.

The construction and manner of operation of the tracer head motor will now be described.

As shown in Figure 8, the ports 145 and 146 are formed in the motor casting 148 and communicate with annular grooves 149 and 150 formed in the periphery of a sleeve 151 rotatably journaled at opposite ends in bearings 152 and 153. A rotatably adjustable valve member 154 is mounted in the sleeve 151 for independent movement, and has a port 155 formed therein communicating with a longitudinal pressure groove 156 and an additional port 157 communicating with the longitudinal groove 158. The grooves 156 and 158 communicate with lateral grooves 160 and 161, Figure 9, formed in the sleeve 151, there being an intermediate portion 162 constituting a pintle which determines the flow to the three channels 163, 164 and 165 leading respectively to the motor cylinders 166, 167 and 168. The rotatable member 154 projects beyond the end of sleeve 151 for the purpose of attaching an operating knob 159. A spring pressed detent 159' serves to hold the valve member in a given rotatable position relative to the pintle and also serves to connect the valve to the sleeve for rotation therewith. From Figure 9 it should now be apparent that if the valve member 154 is rotated through 180 degrees that the grooves 156 and 158 will be reversely connected to opposite sides of the pintle. This valve thus serves as a reversing valve, in the sense that it determines in the first instance the direction of rotation that will be imparted to the tracer head, the plunger 108 merely changing this direction.

Reciprocably mounted in each cylinder is a piston 169 engaging an eccentric cam 170 having an anti-friction ring 171 mounted on its periphery to eliminate wear between the surface of the cam and the piston. The cams 170 are keyed or splined on a drive shaft 172 which is integrally connected to the sleeve 151, the sleeve having a spiral gear 173 secured thereto. This gear meshes with a similar gear 174 keyed to the shaft 175 which in turn effects rotation of the tracer head. It will thus be seen that power means in the form of an hydraulic motor have been provided for effecting rotation of the tracer head upon initial deflection of the tracer, and for changing this direction after the tracer has reached its neutral position. This shaft also serves to effect rotational movement of the directional control valve 140.

The directional control valve is provided with four ports 176, 177, 178 and 179 reference being had more particularly to Figures 17 and 25 to 29 inclusive which are connected respectively by lines 180, 181, 182 and 183 to a series of ports in a plurality of balancing valves indicated generally by the reference numerals 184, 185, 186 and 187. Each of these channels are also connected respectively to an end of the hydraulic motors for effecting movement of the work in two directions in a given plane. For instance assuming that the motors are oriented in such a manner in Figure 17 that they effect movement in the direction of the four poles of the compass as shown in Figure 17A, then the ends of the respective cylinders to which pressure is applied to effect movement in a given direction may be denoted by a suitable indicia according to the direction of movement effected. For instance, if movement of piston 188 reciprocably mounted in cylinder 189 effects movement in a north direction when pressure is admitted to the port 190 thereof then this end of the cylinder and its supply line may be designated by the reference numeral N. If pressure is admitted to port 191 of cylinder 189, movement will be effected in a south direction and this end of the cylinder and its supply line may be designated by the letter S. Similarly, the opposite ends of cylinder 192 and the respective supply lines 182 and 183 may be designated E and W. When pressure is admitted to any one of the four motor ports 190, 191, 193 or 194, movement in the direction of one of the four points of the compass will result and the opposite end of the particular cylinder which is being operated will be connected to exhaust, while the piston in the other motor cylinder will be hydraulically locked to prevent relative movement thereof. If movement is to be effected in any direction intermediate these four cardinal positions, pressure must be admitted to at least two of the ports 190, 191, 193 and 194 but the two ports must be in different cylinders. If pressure is admitted to two cylinders at the same time, there must be a proportionate division of flow between them which will always be uneven, except for a 45 degree movement, thereby imparting unequal velocities to the slides and in order to maintain these velocities it is necessary to balance the flow to these cylinders in order to maintain their respective velocities regardless of variations in work resistances. Since there are four combinations possible, four balancing valves have been provided, the valve 184 balancing the flow between south and east lines, valve 185 balancing the flow between the east and north lines, valve 186 balancing the flow between the north and west lines and valve 187 balancing the west and south lines. The manner of operation is as follows:

If pressure is supplied to the line 180 to effect movement in a south direction, the opposite end of cylinder 189 will be connected to reservoir through the balancing valves as explained hereafter and the remaining ports 178 and 179 of the directional control valve will be closed, permitting no flow in lines 181, 182 and 183. Pressure fluid in line 180 will flow to port 195 of balancing valve 184 which will shift the plunger thereof upward as viewed in Figure 17 and connect port 196 to which return line 216 from port 190 of cylinder 189 is connected, with port 197. Pressure in line 180 will also connect with port 200 of valve 187 thereby shifting the plunger thereof downward connecting port 201 with port 202. This couples channel 217 extending between ports 197 and 201 to the return line 225 thus permitting discharge from the north end of cylinder 189.

Since the lines 181 and 216 are connected to exhaust, the port 213 will connect the adjacent ends of valves 185 and 186 to reservoir thereby permitting the pressure at ports 195 and 200 to force the fluid from the opposite ends of these valves 184 and 187 through ports 214 and 215 to the ends of valves 185 and 186 to cause their plungers to move toward one another. In a similar manner if pressure is admitted to line 181 to effect movement of the table in a north direction, the channel 180 would be connected to exhaust, pressure being admitted to port 213 effecting separation of the plungers in valves 185 and 186 and this would be possible because the ports 195 and 200 will be connected to reservoir through ports 294 and 295, channel 296, ports 297 and 298, and channel 225. Likewise if pressure is admitted to either line 182 or 183, the corresponding line will be connected to reservoir.

If pressure is admitted to two lines to effect movement in an angular direction such as southwest, fluid will then be admitted to channels 180 and 183 and the corresponding channels 182 and 181 will be sealed from the incoming pressure. It is therefore necessary to balance the pressure in lines 180 and 183 to maintain whatever volumetric proportions are established by the directional control valve 140 irrespective of variations in work resistance. In this case fluid will be admitted to port 215 tending to shift the plunger of balancing valve 187 upward while pressure will be admitted to the port 200 tending to shift the same plunger downward. It will thus be seen that the plunger of valve 187 will take up a position that will balance the pressure between the south and west lines and maintain the proportionate flows thereto. The return flow from port 190 will pass through channel 216, port 196, through valve 184, port 197, and channel 217 to port 201, which will now be partially connected to port 202 by the annular groove 218 of valve plunger 187. Similarly, the exhaust from port 193 of cylinder 192 will pass through channel 219 to port 204 which will be partially connected to port 203 by the annular groove 220 of valve spool 187. The exhaust fluid will flow from this port through channel 221, port 222, annular groove 223 of valve 186 and port 224 to the main return line 225. From this it will be seen that as the valve 187 floats back and forth, the spool 226 will vary the openings of ports 202 and 203 thereby varying the hydraulic resistance thereof and controlling the return flow from the two cylinders to balance the incoming pressures to those cylinders irrespective of variations in work resistance. This is in accordance with the theory explained in copending application of Hans Ernst, Serial Number 614,980, filed June 2, 1932. Similarly the valve 186 will balance the pressure distribution to ports 190 and 194 when the movement is in the northwest quadrant; the valve 185 will balance the pressure between ports 190 and 193 when the movement is in the northeast quadrant; and the valve 184 will balance the pressure between port 193 and port 191 when the movement is in the southeast quadrant. It will thus be seen that balancing valves have been provided for maintaining the division of flow to the respective cylinders to maintain the rate of movement in the various angular directions at the velocities determined by the directional control valve and irrespective of variations in the work resistances encountered in any of these directions.

The construction of the hydraulic motors that effect actuation of the saddle and table is more particularly shown in Figures 3, 4 and 5. In Figure 4, which shows the construction of the saddle motor, it will be seen that the supply lines 190 and 191 comprise channels formed in the knee casting which communicates with radial channels 227 and 228 formed in a piston rod 229 which is fixed in the knee 65 and held against longitudinal movement by a washer 230 engaging a shoulder 231 formed on the piston rod, and a lock nut 232 threaded on the extreme end of the piston rod and bearing against a second washer 233, rotation of the nut drawing the washers into engagement with opposite sides of a fixed part of the knee. The other end of the piston rod is supported in stuffing boxes 234 formed at opposite ends of the cylinder 189 which in turn depends from the underside of the saddle. In other words, one end of the piston is supported by the knee and the other end by the cylinder heads of the saddle actuating motor. A piston 188 is integrally secured to the end of the piston rod and held against longitudinal movement therewith so that in operation the cylinder constitutes the moving member. A longitudinal bore 235 is formed in the piston rod and connected at one end by port 228 to the supply line 191 and at the other end by a radial bore 236 to the left end of the cylinder 189 as viewed in Figure 4. A tube 237 of smaller diameter than the bore 235 is mounted therein and connected at one end by the radial bore 227 to the supply line 190 and at the opposite end by a radial bore 238 to the right hand end of cylinder 189. It will thus be seen that the alternate admission of pressure to channels 190 and 191 will cause movement of the work and pattern in one direction relative to the cutter and tracer.

The fluid conducting channels 182 and 183 are also formed in the knee casting 65 only one of which is shown in Figure 5, and terminate in threaded bores 239 in which is fastened one end of a tube 240 forming part of a telescoping tube construction whereby connection is maintained with the saddle 67 during reciprocation thereof. A longitudinal bore 241 is formed in the saddle, the opposite ends of the bore having stuffing boxes 242 mounted therein through which the tube 240 slides. The tube 240 has a radial bore 244 communicating with the interior of the bore 241 whereby fluid from channel 182 will be conducted to the bore in the saddle in all positions of longitudinal adjustment thereof. A vertical bore 245 intersects the bore 241 and has threaded therein a pipe 246 which leads to one end of the table cylinder, such as port 193. The table cylinder 192, as shown in Figure 3, is supported at opposite ends on the saddle 67 and fixed therewith against longitudinal movement. A piston rod 247 is fixed at one end to the depending apron 248 of the table and supported at the other end by the bracket 249 attached to the opposite end of the table. A piston 250 is formed integral with the piston rod whereby upon admission of pressure to the cylinder the piston, piston rod and table will move relatively to the fixed cylinder 192. The construction shown in Figure 5 is duplicated for connecting the other table channel 183 with the port 194. From this it will be seen that even although the saddle is slidably mounted on the knee that a flexible connection is maintained for supplying fluid to the table in all positions thereof.

The construction of the directional control valve which divides the flow among the four supply lines of the slide actuating motors in such sequence that one rotation of the valve will effect relative movement of the work support about the tracer through an angle of 360 degrees will now be described, reference being had more particularly to Figures 25 to 29 inclusive. The supply line 138 is connected to the port 139 formed in the housing 140 and this port communicates with an annular groove 251 formed in the sleeve 252 which is fixed in the housing against rotation. A plurality of radial bores 253 are formed in the bottom of the annular groove to conduct the fluid to a second annular groove 254 formed in the rotatable shaft 26. An axial bore 255 is formed in the member 26 for conducting the pressure from the annular groove 254 to a plurality of segmental slots 256, 257, 258 and 259 formed in the member 26, each of these slots serving to supply pressure to a particular motor supply line. As shown in Figure 26, the slot 256 is adapted to supply line 183; the slot 257 in Figure 27 is utilized to supply channel 182; slot 258 as shown in Figure 28 is utilized to supply channel 181, and the slot 259 as shown in Figure 29 is utilized to supply channel 180. The sleeve 252 also has a plurality of segmental grooves 256', 257', 258' and 259' formed therein, these grooves being longitudinally spaced of the sleeve so as to register successively with the channels 183, 182, 181 and 180 and furthermore these grooves are circumferentially spaced through angles of 90 degrees to effect successive registration. The segmental slots in the sleeve are so formed that the intersection points 299 and 300 between the slot and the internal bore of the sleeve, Figure 26, subtend an angle of 90 degrees. Similarly, the segmental groove such as 256 in the rotatable shaft 26 is cut of sufficient depth that the chord thereof will be equal to the chord connecting the points 299 and 300. Thus for each 90 degrees of rotation of member 26, a segmental groove in one member will register with a segmental groove in the sleeve to cause a flow of pressure to a connected channel, the remaining channels being disconnected from pressure as shown in Figures 26, 27 and 28. The grooves in the member 26 are displaced axially with respect to those in the sleeve so as to form a narrow slit as shown in Figure 30. These slits have sufficient resistance that the proportion of their openings determines the division of flow between the two connected motor passages. From this it should be apparent that if the member 26 is now rotated from the position shown in Figure 29, in a clockwise direction, that the fluid will be successively supplied to channels 183, 182, and 181 in the order recited, and that except for the four quadrant positions there will be two of these channels connected to pressure simultaneously. For instance, as the valve rotates clockwise from the position shown in Figures 26 and 29, it will be apparent that fluid from groove 256 will begin to flow to channel 183 and that the groove 259 will begin to close off the flow to channel 176. In other words, the length of the slit 260' outlined in Figure 30, gradually reduces as shown at 261', Figure 31, and increases as shown at 260'' in Figure 32, which is a view looking in the direction of the arrow 301 of Figure 26. Thus as the flow to one is decreased, the flow to the other will be increased because there is a constant incoming flow of fluid which must be divided between these two channels, and inversely as the ratio between the resistances of their respective slit ports, the division being maintained irrespective of variations in work resistances by balancing valves which automatically maintain a constant pressure drop across these various resistances or slits at all times.

The rotatable member 26 of the directional control valve is integrally associated with the tracer head for joint rotation therewith as previously described in connection with Figure 6. As mentioned above, it is desirable that the angular position of the tracer head indicate the direction of resultant feed movement between the cutter and work as well as between the tracer and pattern, and in order to bring this about it is evident that during a uniform change or rotation of the tracer head, the resultant direction of feed movement must uniformly change therewith in order that a dial associated with the tracer head will truly indicate the direction of feed movement. The valve ports shown in Figures 26 to 29 inclusive open and close in accordance with the rotation of the tracer head. To insure that the proper quantity of fluid is delivered to the respective operating cylinders in such proportion that the desired results may be obtained, the slit openings are somewhat tapered in effect at one end as shown so that their area will increase non-uniformly at the beginning so that the flow will vary slightly from a straight line and in accordance with the graph shown in Figure 33. In this graph, the angle of rotation of the valve is plotted against quantity of fluid passing through the ports formed in this manner it is possible to insure that the fluid will flow therethrough in a manner to cause the change in the direction of feed movement in direct relation to the angle of rotation of the tracer head.

To assist the operator in determining the direction of feed movement suitable indicia have been provided on the tracer head 25 and corresponding marks on the tracer head support in the manner shown more particularly in the expanded view of Figure 34. A fixed mark 260 is placed on the valve housing 140 in a suitable position that it may be viewed by the operator when standing at his normal position at the front of the machine. Graduation marks extending up to 90 degrees on either side of the zero mark may be provided, the graduations to the right of the zero mark indicating the angular movement to the right and the graduations on the opposite side indicating the angular movement to the left. A plurality of marks 261, 262, 263 and 264 are placed on the rotatable head 25, the mark 261 indicating the forward position which when aligned with the zero mark will indicate that the slide will move in a direction toward the operator. The words "Right" and "Left" may be suitably positioned on opposite sides of the zero mark to indicate the direction in which the direction of feed will veer upon movement of the pointer 261 to either side of the zero point. The pointers 262 and 263 on opposite sides of pointer 261 may be labeled "Right" and "Left". When either of these marks are aligned with the zero mark, it will indicate that the feed movement will occur in a direction either to the right or left of the operator and variation of this mark to either side of the zero line will indicate that this movement will be either forward or back. The last mark 264 may be marked "Backward" to indicate that the slide will move away from the operator. From this it will be seen that the operator may readily observe the direction of resultant movement that the slides will take for any position of the rotatable tracer head.

As previously shown in connection with the operation of the tracer head motor, the channels 143 and 144 are connected together by valve plunger 118 as shown in Figure 17 when the tracer is in an undeflected position. With these lines connected together, it is apparent that the motor could be manually rotated without difficulty, because the fluid will merely flow back and forth from one side of the motor to the other. Due to this condition, it is possible to place a hand wheel 265 on the end of the shaft 151 to effect rotation thereof manually so that the tracer head may be rotatably positioned when the power is disconnected from the motor. This is of value when setting up the machine as it is necessary for the operator to position the tracer head in a proper direction before starting the machine to insure that the tracer will feed toward the pattern when the machine is started. This arrangement is also useful when it is desired to do manual profiling without the use of a pattern where the direction of movement of the cutter is determined by the operator. In other words the directional control valve is manually controlled rather than pattern controlled.

The operation of the machine for automatic pattern control milling will now be described.

The pattern and work are positioned on the table 68 and spaced apart in accordance with the spacing of the axes of the tracer head and cutter. A suitable cutter and tracer are attached to the end of the cutter spindle and tracer arm and the tracer head is positioned so that the direction of feed will first be toward the pattern. The starting lever 76 on the side of the machine is then moved to effect engagement of clutch 75 and thereby rotation of the cutter and actuation of the pump 82. Fluid pressure will then flow to the tracer head motor and to the table cylinders in such a manner that the tracer will be moved into contact with the pattern after which it will readjust itself parallel to the pattern surface in the manner explained in detail herein.

After completion of the work, means have been provided for causing the tracer and cutter to move out of contact with the respective elements in an easy and gradual manner to prevent marring of the work. For this purpose a pivoted handle 266 is mounted on the forward part of the column and operatively connected to the distributor valve plunger 111. A set screw 267 may be threaded in the end of the lever to limit the amount of movement thereof. Actuation of this lever against the pressure of spring 112 will move the distributor valve 111 toward the safety position previously described, which position of the valve will cause rotation of the tracer head at a maximum rate and in a direction to cause undeflection of the tracer and at the same time reduce the feed rate to a minimum. The lever is held in this position until the tracer head has rotated to such a position that it indicates movement of the tracer in a direction away from the pattern which insures that the tracer button has left the pattern so that upon release of the handle the tracer button will no longer contact the pattern or be under its control. In this case the feed rate will then be at a maximum in the determined direction and will not vary therefrom. In this manner the tracer and cutter are gradually moved away out of contact with the work and pattern without an abrupt stop in their movement such as might cause a mar on the finished surface. After the tracer and cutter have cleared the work the operator will move the starting lever to a stop position to stop rotation of the cutter and operation of the pump.

An important advantage of the tracer mechanism utilized in this machine is that a punch may be formed directly from a die as shown in Figure 35; or the reverse that a die may be formed directly from a punch as shown in Figure 36. In such a case as shown in Figure 35 the tracer arm is adjusted so that the distance between the contact surface 15 of the tracer button and the center of the tracer head 12 is equal to the radius 302 of the cutter used to machine the punch. As previously explained, mechanism has been provided for maintaining the line Y—Y' always perpendicular to the tangent drawn through the point of contact with the pattern and this will be true irrespective of the side of the contour line that the cutting takes place. With this arrangement, it is possible to place the center of the tracer head in the same position as the center of the cutter even although the cutter is upon one side of the contour line and the tracer is contacting upon the opposite side thereof. This produces the same effect as if the tracer button was of zero diameter which is impossible with present known machines. By reversing these parts, it will be seen that the reverse operations may be carried out as shown in Figure 36.

Another important feature of this machine is its use as a die-sinker without the necessity of making major changes to the machine after being used for profiling purposes.

As will be understood it is necessary to effect relative movement between the cutter and work in three directions when cutting dies and the like, and this third movement is effected in the present case through elevation of the knee 65. The novel method of die-sinking used herein consists of a continuous movement somewhat spiral in nature between the cutter and work from the moment that the cutter contacts the work until the finished die is produced. The relative movement in two directions in a horizontal plane is accomplished by the mechanism already described for profiling purposes, and the additional feeding movement is effected automatically by coupling the hydraulic motor shown in Figure 8 to the elevating screw of the knee so that for each movement of 360 degrees between the work and cutter in a horizontal plane the work will also be elevated or lowered a predetermined amount.

The hydraulic motor has connected therewith a shaft 268 which projects through the housing 269 as shown in Figure 2 where it is coupled by means of bevel gears 270 to a vertical spline shaft 271. This spline shaft extends through a bracket 272 projecting from the rear of the knee which has journaled therein a second pair of bevel gears 273 and 274. These gears are mounted for free rotation with respect to the shaft 271 and a clutch member 275 is splined on the shaft for alternate engagement with these gears for effecting rotation of a third bevel gear 276 in opposite directions. The bevel gear 276 is keyed to shaft 277 which extends into a variable feed gear box 278 inserted in the side of the knee and provided with speed change levers 279 attached to the side thereof. This variable feed box may be of any suitable construction and the final shaft 280 thereof is provided with a bevel gear 281 meshing with bevel gear 282 keyed to the upper end of the elevating screw 283. By adjusting the levers 279 it will be apparent that the rate of vertical feed of the knee for each spiral movement of the work and pattern about the tracer and cutter respectively may be varied to suit the material or finish desired. The clutch member 275 may be shifted by means of a manual control lever 284 to determine the direction of feeding movement of the knee. This lever is secured to the end of the horizontal shaft 285 which has the shifter fork 286 secured thereto. This shaft extends through the opposite side of the gear box 272 where it is provided with a trip arm 287. A T-slot 288 is formed on the side of the column for receiving trip dogs 289 which are adapted to cooperate with the trip arm 287 to throw the clutch 275 to a neutral position automatically after the die-sinking operation has been completed. If the die-sinking has progressed by gradually moving the knee upward, it may be returned to starting position, after the clutch 275 has been automatically positioned in a neutral position, by means of the manually rotatable lever 290 secured to the end of the horizontal shaft 291, journaled in the knee, and having on its inner end a bevel gear 292 meshing with bevel gear 282. The shaft 285 may be provided with detent mechanism comprising a spring pressed plunger 293 for holding the clutch in any one of its three positions. Since the motor 129 is utilized to rotate the tracer head, it will be apparent that the tracer head will only make one complete revolution after the work has completed its orbital movement thereabout and this will be true even although there may be some reverse movements during the progress of a complete rotation. This motor may therefore be coupled to the knee to effect feeding thereof and the resultant feed movement at the end of a complete rotation of the work will be that determined by the setting of the feed box 278.

From the foregoing description it should now be apparent that a profiling and die-sinking machine tool has been produced having an improved tracer control mechanism which makes possible continuous operation through angles of 360 degrees or greater, without attention on the part of the operator, and in which the tracer is automatically positioned in contact with the work and which may be withdrawn from contact with the work without marring the same. This improved construction also makes possible reproduction of work hitherto deemed impossible of reproduction by tracer controlled methods; easy conversion from one type of use to another and the use of cutters of different diameters from the tracer button. Attention is invited to the fact that the direction indicator on the tracer head may also be utilized to aid in cutting an original outline under manual control without the aid of a pattern.

That which is claimed is:

1. A pattern controlled milling machine for reproducing work from a pattern comprising a cutter, a power circuit for controlling the direction of resultant feed movement between cutter and work in two right angular paths or in any radial direction in the four quadrants formed by the intersection of said paths including power actuable motors, a rotatable power distributing element therefor, a single power line connected to said element, means coupling the motors in parallel to said element for individual or simultaneous actuation, and tracer controlled means for rotatably positioning said element to couple the power line to one motor or simultaneously to all motors to effect a feed movement selectively in the right angular paths or in the quadrantal paths.

2. A pattern controlled milling machine for reproducing work from a pattern comprising a cutter, a power circuit for controlling the direction of resultant feed movement between cutter and work in right angular paths or in any radial direction in the four quadrants formed by the intersection of said paths including a plurality of power actuable motors, a rotatable power distributing element therefor, means coupling the motors in parallel to said element for individual or simultaneous actuation, power actuable means for effecting rotation of said distributing element, and tracer mechanism for controlling energization of said power actuable means and thereby the direction of resultant feed movement.

3. A pattern controlled milling machine for reproducing work from a pattern comprising a cutter, a power circuit for controlling the direction of resultant feed movement between cutter and work in right angular paths or in any radial direction in the four quadrants formed by the intersection of said paths including power actuable motors, a power distributing element therefor, means coupling the motors in parallel to said element for individual or simultaneous actuation, means to supply a constant quantity of power to said distributing element, and tracer control means for automatically positioning said element to distribute said power to the motors individually for movement in the right angular paths, and simultaneously for movement in the quadrantal paths, the resultant movement in the right angular paths being always at a greater rate than the movement in the quadrantal paths.

4. A pattern controlled milling machine for reproducing work from a pattern comprising a cutter, a power circuit for controlling the direction of resultant feed movement between cutter and work in right angular paths or in radial directions in the four quadrants formed by the intersection of said paths including a plurality of slides, power actuable motors coupled to each slide, a power distributing element for said motors, means coupling the motors in parallel to said element for individual or simultaneous actuation, a constant source of power for energizing said circuit, means for reducing the amount of power supplied to said circuit and thus vary the resultant feed rate, and tracer control means for automatically positioning said element to effect individual or simultaneous distribution of power to said motors and thereby determine the path of said resultant feed movement.

5. A pattern controlled milling machine for reproducing work from a pattern comprising a cutter, a plurality of slides for effecting relative movement between the work and cutter, a power circuit for controlling the direction of resultant feed movement effected by said slides including power actuable motors, a rotatable power distributing element, means coupling the motors in parallel to said element for individual or simultaneous actuation, a source of power, tracer mechanism including a reciprocable control member for coupling of power to said element for distribution to the motors and effecting rotation thereof, and a universally mounted tracer operatively coupled to said reciprocable element for determining the rotatable position of the power distributing element and thereby the direction of resultant feed movement between cutter and work.

6. A pattern controlled milling machine for reproducing work from a pattern comprising a cutter, a plurality of slides for effecting relative movement between the cutter and work, individual motors coupled to the slides, a power circuit for controlling the direction of resultant feed movement effected by said slides in accordance with a pattern including a source of power, a power distributing element, means coupling the motors in parallel to said element and a tracer controlled reciprocable member interposed between the source of power and said distributing element, said member being movable to a neutral position upon predetermined deflection of the tracer to couple the power source to said distributing element for operation of said slides at a maximum rate.

7. A pattern controlled milling machine for reproducing work from a pattern comprising a cutter, a plurality of slides for effecting relative movement between the work and cutter, said slides having individual motors coupled thereto, a power circuit for controlling the direction of resultant feed movement effected by said slides including a source of pressure, a rotatable power distributing element, means coupling the motors in parallel to said element, tracer control means including a reciprocable member for determining rotation of said power distributing element, said reciprocable member having a neutral position to stop said rotation and an operating position on either side thereof, and means to increase the rate of rotation of said power distributing element upon increase in departure of said reciprocable element from its neutral position.

8. A pattern controlled milling machine for reproducing work from a pattern including a cutter, a plurality of slides for effecting relative movement between work and cutter, actuating motors coupled to the individual slides, a power circuit for controlling actuation of said motors at proportionate rates and thereby the direction of resultant feed movement between cutter and work including a rotatable power distributing element, rotation of said element in a clockwise direction effecting a corresponding change clockwise in the angle of the resultant movement, or in a counter-clockwise direction to effect a corresponding change counter-clockwise in the angle of the resultant feed movement, a source of power, a universally mounted tracer, a control member coupled to the tracer for movement to a neutral position upon predetermined deflection of the tracer, and means controlled by said member upon movement in one direction from said neutral position to effect clockwise rotation of the distributor element and in the other direction to effect counter-clockwise rotation of said distributor element.

9. A pattern controlled milling machine for reproducing work from a pattern comprising a cutter, a plurality of slides for effecting relative movement between the work and cutter, actuating motors coupled to the individual slides, a power circuit for controlling actuation of said motors at proportionate rates and thereby the direction of resultant feed movement between cutter and work including a rotatable power distributing element, rotation of said element in a clockwise direction effecting a corresponding change clockwise in the angle of the resultant movement, or in a counter-clockwise direction to effect a corresponding change counter-clockwise in the angle of the resultant feed movement, a source of power, a universally mounted tracer, a control member coupled to the tracer for movement to a neutral position upon predetermined deflection of the tracer, and means controlled by said member upon movement in one direction from said neutral position to effect clockwise rotation of the distributor element and in the other direction to effect counter-clockwise rotation of said distributor element, the rate of said rotation in either direction increasing with the amount of departure of the control member from its neutral position.

10. A pattern controlled milling machine for reproducing work from a pattern comprising a cutter, a plurality of slides for effecting relative movement between the work and cutter, actuating motors coupled to the individual slides, a power circuit for controlling actuation of said motors at proportionate rates and thereby the direction of resultant feed movement between cutter and work including a rotatable power distributing element, rotation of said element in a clockwise direction effecting a corresponding change clockwise in the angle of the resultant movement, or in a counter-clockwise direction to effect a corresponding change counter-clockwise in the angle of the resultant feed movement, a source of power, a universally mounted tracer, a control member coupled to the tracer for movement to a neutral position upon predetermined deflection of the tracer, means controlled by said member upon movement in one direction from said neutral position to effect clockwise rotation of the distributor element and in the other direction from said neutral position to effect counter-clockwise rotation of said distributor element, and auxiliary means to reverse the direction of movement effected by the control member.

11. A pattern controlled milling machine for reproducing work from a pattern comprising a cutter, a plurality of slides movable in angular related directions for effecting a resultant feed movement between cutter and work, individual motors coupled to the slides, a power circuit for controlling actuation of said motors including a rotatable power distributing element, means coupling the motors to said element for individual or simultaneous actuation, an additional motor for rotatably positioning said distributing element to determine the relative actuating velocities of said motors, a source of power, and tracer control means including an universally mounted tracer arm for coupling the power to said element and to the additional motor to position the power distributing element whereby the slide motors will be individually or jointly actuated to effect a resultant feed movement in a direction determined by the pattern.

12. A pattern controlled milling machine for reproducing work from a pattern comprising a cutter, a plurality of slides movable in angular related directions for effecting a resultant feed movement between cutter and work, individual motors coupled to the slides, a power circuit for controlling actuation of said motors including a rotatable power distributing element, means coupling the motors to said element for individual or simultaneous actuation, an additional motor for rotatably positioning said distributing element to determine the relative actuating velocities of said motors, a source of power, tracer control means including an universally mounted tracer arm for coupling the power to said element and also to the additional motor to effect rotation thereof in opposite directions to position the power distributing element whereby the slide motors will be individually or jointly actuated to effect a resultant feed movement in a direction determined by the pattern, and means in said additional motor for reversing the directions of rotation normally effected by said tracer control means.

13. A pattern controlled milling machine for reproducing work from a pattern including a cutter, a power circuit for controlling the direction of resultant feed movement between cutter and work in right angular paths or in radial directions in the four quadrants formed by the intersection of said paths including power actuable motors, a power distributing element therefor, an hydraulic motor for rotatably positioning said element to determine the relative operating velocities of said motors, a source of pressure therefor, and tracer control means including a reciprocable valve member movable to a neutral position upon predetermined deflection of the tracer to disconnect the pressure from said motor and portions on said valve upon movement from its neutral position for coupling the pressure to said hydraulic motor for effecting rotation thereof, the direction of movement of said valve from its neutral position determining the direction of rotation of said motor.

14. A tracer mechanism for a pattern controlled milling machine having a plurality of slides and actuating motors coupled to the slides for effecting relative movement between the cutter and work and between the tracer and pattern comprising a rotatable tracer head, a tracer point associated therewith for rotation about the axis of the head, means to maintain the radial arm of said tracer point perpendicular to the pattern at the point of contact therewith including a power actuable member operatively coupled to the tracer point, and additional means under control of the tracer for actuating said slide motors at proportionate rates to cause relative feed between cutter and work in a direction perpendicular to said radial arm.

15. A tracer mechanism for a pattern controlled milling machine including a rotatable head, a tracer button for contacting the pattern mounted eccentrically on the head for movement about the axis thereof, and means to adjust the axis of the tracer button relative to the axis of the rotatable head whereby the radial arm of the contact point of the button will equal the radius of the cutter utilized with the machine.

16. A tracer mechanism for a pattern controlled milling machine including a rotatable head, a tracer button for contacting the pattern mounted eccentrically on the head for movement relative to the axis thereof, means to adjust the axis of the tracer button relative to the axis of the rotatable head whereby the radial arm of the contact point of the button will equal the radius of the cutter utilized with the machine, said means including a micrometer screw and a micrometer gauge associated therewith.

17. A tracer mechanism for determining relative movement between a cutter and work in accordance with a pattern comprising a rotatable head, a tracer button supported for universal movement by said head, the axis of said button being eccentric to the axis of the head, means to adjust the radial arm of the pattern contact surface of the button whereby it will be equal to the radius of the cutter utilized with the machine, a power operated motor controlled by said button to effect rotation of the head and maintain the radial arm of the tracer button perpendicular to the pattern, and additional means controlled by the tracer button in all adjusted positions for maintaining the feed between cutter and work in a direction perpendicular to said radial arm.

18. A tracer mechanism for determining relative movement between a cutter and work in accordance with a pattern comprising a rotatable head, a tracer button supported for universal movement by said head, the axis of said button being eccentric to the axis of the head, means to adjust the radial arm of the pattern contact surface of the button whereby it will be equal to the radius of the cutter, a power operated motor to effect rotation of the head to maintain the radial arm of the tracer button perpendicular to the pattern, additional means controlled by the tracer button in all adjusted positions thereof for maintaining the feed between cutter and work in a direction perpendicular to said radial arm, and means on the tracer head to indicate the direction of said feed movement.

19. A tracer control mechanism for determining the direction of relative feed between cutter and work of a pattern controlled milling machine in accordance with a given pattern including a rotatable tracer head, an universally movable tracer point adapted to contact the pattern, said tracer point being rotatable about the axis of said head to maintain the radial arm thereof perpendicular to the pattern at the point of contact therewith, a reciprocable power control element actuable by the tracer point upon deflection thereof, said element being movable to a neutral position upon predetermined deflection of the tracer point to stop rotation of the tracer head, and means operated by the power control element upon movement by the tracer to either side of its neutral position to effect rotation of the tracer head in a direction tending to return the power control element to its neutral position.

20. A tracer control mechanism for determining the direction of relative feed between cutter and work of a pattern controlled milling machine in accordance with a given pattern including a rotatable tracer head, an universally movable tracer point adapted to contact the pattern, said tracer point being rotatable about the axis of said head to maintain the radial arm thereof perpendicular to the pattern at the point of contact therewith, a reciprocable power control element actuable by the tracer point upon deflection thereof, said element being movable to a neutral position upon predetermined deflection of the tracer point to stop rotation of the tracer head, means operated by the power control element upon movement by the tracer to either side of its neutral position to effect rotation of the tracer head in a direction tending to return the power control element to its neutral position, and means to increase the rate of rotation of the tracer head upon increase in departure of the power control element from its neutral position.

21. A tracer mechanism for determining the relative movement between cutter and work in a pattern controlled milling machine in accordance with a pattern comprising a rotatable tracer head, a tracer button associated therewith, a reciprocable power control element actuable by the tracer button upon deflection thereof, said element being movable to a neutral position upon predetermined deflection of the tracer, a motor for effecting rotation of the tracer head to maintain the radial arm of the contact portion of the tracer button with respect to the axis of the tracer head perpendicular to the pattern, and means actuable by the power control element upon movement to opposite sides of its neutral position to effect rotation of the tracer head in opposite directions, the direction being such as to tend to return the control element and tracer button to a neutral position.

22. A tracer mechanism for determining the relative movement between cutter and work in a pattern controlled milling machine in accordance with a pattern comprising a rotatable tracer head, a tracer button associated therewith, a reciprocable power control element actuable by the tracer button upon deflection thereof, said element being movable to a neutral position upon predetermined deflection of the tracer, a motor for effecting rotation of the tracer head to maintain the radial arm of the contact portion of the tracer button with respect to the axis of the tracer head perpendicular to the pattern, means actuable by the power control element upon movement to opposite sides of its neutral position to effect rotation of the tracer head in opposite directions, the direction being such as to tend to return the control element and tracer button to a neutral position, and means to increase the rate of rotation upon increase in departure of the control element from its neutral position.

23. A tracer mechanism for determining the relative movement between cutter and work in a pattern controlled milling machine in accordance with a pattern comprising a rotatable tracer head, a tracer button associated therewith, a reciprocable power control element actuable by the tracer button upon deflection thereof, said element being movable to a neutral position upon predetermined deflection of the tracer, a motor for effecting rotation of the tracer head to maintain the radial arm of the contact portion of the tracer button with respect to the axis of the tracer head perpendicular to the pattern, means actuable by the power control element upon movement to opposite sides of its neutral position to effect rotation of the tracer head in opposite directions, the direction being such as to tend to return the control element and tracer button to a neutral positon, means to increase the rate of rotation upon increase in departure of the control element from its neutral position, and additional means in the tracer head motor to determine the direction of rotation thereof.

24. In a pattern controlled milling machine for reproducing work from a pattern the combination of a cutter, angularly related slides, actuating motors therefor, a power circuit for controlling the direction of resultant feed movement between cutter and work including a directional control valve, means coupling the motors in parallel to said valve for individual or simultaneous actuation, balancing valves between each coupling means and the remaining coupling means said valve being rotatable to progressively change the angle of the resultant feed movement, and manual means to rotate the valve to determine said direction.

25. In a pattern controlled milling machine for reproducing work from a pattern, the combination of a cutter, angularly related slides, actuating motors therefor, a power circuit for controlling the direction of resultant feed movement between cutter and work including a directional control valve, means coupling the motors in parallel to said valve for individual or simultaneous actuation, balancing valves between each coupling means and the remaining coupling means said valve being rotatable to progressively change the angle of the resultant feed movement, manual means to rotate the valve to determine said direction and means associated with the valve to indicate the direction effected.

26. In a pattern controlled milling machine having a cutter and tracer, the combination of means to control the direction of relative movement between cutter and work in accordance with a pattern including a plurality of slides movable normal to one another, motors for effecting actuation of the slides, a directional control valve coupled with the motors for determining the direction of resultant movement thereof, a tracer mechanism including a rotatable head, a universally mounted tracer button supported by the head having an effective contact radius arm relative to the axis of the head equal to the radius of the cutter, means to rotate the head to maintain said radius arm perpendicular to the pattern at the point of contact therewith, and means actuated by deflection of the tracer to rotate said directional control valve so that the direction of resultant feed movement will always be perpendicular to said radius arm.

27. In a pattern controlled milling machine having a cutter and tracer, the combination of means to control the direction of relative movement between cutter and work in accordance with a pattern including a plurality of slides movable normal to one another, motors for effecting actuation of the slides, a directional control valve coupled with the motors for determining the direction of resultant movement thereof, a tracer mechanism including a rotatable head, a universally mounted tracer button supported by the head having an effective contact radius arm, relative to the axis of the head equal to the radius of the cutter, means to rotate the head to maintain said radius arm perpendicular to the pattern at the point of contact therewith, means actuated by deflection of the tracer to rotate said directional control valve so that the direction of resultant feed movement will always be perpendicular to said radius arm, said means including a reciprocable power control element having a neutral position upon predetermined deflection of the tracer and an operating position on either side thereof, and means operable upon movement of said control element to either of said operating positions to rotate the valve and head in opposite directions.

28. In a pattern controlled milling machine having a cutter and tracer, the combination of means to control the direction of relative movement between cutter and work in accordance with a pattern including a plurality of slides movable normal to one another, motors for effecting actuation of the slides, a directional control valve coupled with the motors for determining the direction of resultant movement thereof, a tracer mechanism including a rotatable head, a universally mounted tracer button supported by the head having an effective contact radius arm relative to the axis of the head equal to the radius of the cutter, means to rotate the head to maintain said radius arm perpendicular to the pattern at the point of contact therewith, means actuated by deflection of the tracer to rotate the directional control valve and maintain the direction of resultant feed movement perpendicular to the radius arm, said means including a reciprocable power control element having a neutral position and an operating position on either side thereof, means operable upon movement of the control element to either of its operating positions to rotate the valve and head in opposite directions, and means to increase the rate of rotation upon increase in departure of said element from its neutral position.

29. A pattern controlled milling machine having a plurality of slides movable in directions at right angles to one another, hydraulic motors coupled to the slides for effecting relative movement between the cutter and work, a directional control valve for supplying fluid to said motors in predetermined proportions in accordance with the direction of movement desired, a tracer control mechanism, a reciprocable power control element movable upon predetermined deflection of the tracer to a neutral position, a constant volumetric supply of fluid under pressure connected to the power control element, said control valve being rotatable to vary the direction of movement between cutter and work, an hydraulic motor for effecting rotation of the control valve, means actuable upon deflection of the tracer to divert part of the fluid supply to said motor for effecting rotation thereof during simultaneous actuation of the slides, and means operable when the control element is in a neutral position to deliver the full supply of fluid to said slide motors.

30. An hydraulic pattern controlled milling machine having a plurality of movable slides, hydraulic motors coupled to each slide, a constant volumetric supply of fluid under pressure, a directional control valve for distributing the fluid to said motors in suitable proportions in accordance with the direction of resultant feed movement desired, a flow controlling valve, means to determine the position of said valve including a tracer mechanism comprising a rotatable tracer head having a radial arm for rotation about the axis thereof, a motor for rotating said head to maintain said arm perpendicular to the pattern whereby the direction of relative feed movement will be perpendicular thereto, an universally mounted tracer point carried by the arm, means coupling the tracer point to said flow controlling valve, said valve having a neutral position upon predetermined deflection of the tracer point, portions on the valve when in a neutral position for coupling the full flow of fluid to the directional control valve and thereby to the slide motors, and additional portions on the valve for diverting part of the said flow to the tracer head motor upon movement of the valve to either side of its neutral position by overdeflection of the tracer with respect to said predetermined amount.

31. An hydraulically operated pattern controlled milling machine having a pair of slides movable at right angles to one another, a cylinder and contained piston associated with each slide for determining the relative position between cutter and work in accordance with a given pattern, a source of fluid pressure, a directional control valve interposed between the source of pressure and said cylinders, individual channels extending from the control valve to opposite ends of said cylinders, said valve having means to couple one channel to pressure to effect movement of one slide in its given path of movement, or to two channels to effect a resultant movement at an angle to the fixed paths of movement of the slides, a series of balancing valves associated with each channel, and means to position the respective balancing valves upon the admission of pressure to said channels to effect connection of the opposite ends of the cylinders under pressure to reservoir, said valves being movable to a position to proportion the return flow from the respective cylinders in accordance with the proportions delivered by the directional control valve whereby the slides will move at proportionate velocities irrespective of variations in work resistance.

32. A pattern controlled milling machine having a plurality of slides for determining the relative position between cutter and work, hydraulic motors coupled to the slides, a constant volumetric supply of fluid pressure therefor, a directional control valve for proportioning the fluid supply among said motors in accordance with the direction of resultant movement desired, said valve being rotatable to vary said proportions, an hydraulic motor for effecting said rotation, tracer control mechanism for determining actuation of the motor including a flow controlling valve, a universally mounted tracer, means connecting the tracer to said valve whereby a predetermined deflection thereof will position the valve in a neutral position, portions on the valve for coupling the full supply of fluid to said directional control valve, and additional portions on the valve for reducing the flow to said motors and increasing the flow to said hydraulic motor upon movement of the flow controlling valve to either side of its neutral position, the decrease in flow to the slide motors and the increase in flow to the hydraulic motor continuing to vary with increased departure of the flow dividing valve from its neutral position.

33. A pattern controlled milling machine including a plurality of slides, hydraulic motors coupled to the slides for determining the resultant direction of movement between cutter and work, a constant volumetric flow of fluid pressure, a directional control valve for proportioning flow among the motors in accordance with the direction of resultant feed movement desired, said valve being rotatable to vary the proportions progressively, an hydraulic motor for effecting said rotation, a tracer control mechanism including a flow control valve, a universally mounted tracer, and means coupling the tracer to said flow control valve for effecting longitudinal positioning thereof in accordance with the deflection of the tracer, an auxiliary valve interposed between the flow control valve and the directional control valve, individual channels connecting the auxiliary valve to the directional control valve and to its motor, channel means coupling the flow control valve to the auxiliary valve, said auxiliary valve being positionable during undeflection of the tracer to connect the full flow to the directional control valve and simultaneously short-circuit the directional control valve motor, and portions on the flow control valve to effect repositioning the auxiliary valve upon deflection of the tracer to effect a division of flow between the directional control valve and its motor whereby the directional control valve may be simultaneously rotated during actuation of the slides to change the direction of the resultant feed movement thereof.

34. A machine tool having a plurality of angularly movable slides, hydraulic motors for effecting reciprocation of said slides, a source of fluid pressure, a direction determining valve interposed between the source of pressure and said motors, said valve being rotatable to connect the fluid pressure successively to the ports of said motors in simultaneously increasing and decreasing complementary proportions to effect a resultant feed movement in various angular directions and balancing valve means for maintaining the proportions established by said directional control valve irrespective of variations in work resistances of said motors.

35. A machine tool having a plurality of angularly related slides, hydraulic motors coupled to each slide to effect movement thereof in their respective paths, each of said motors comprising a cylinder and contained piston, ports at opposite ends of said cylinder, a rotatable direction determining valve, a source of pressure coupled to said valve, individual channels extending from the valve to each of said ports, balancing valves between each channel and the remaining channels one rotation of said valve being divided into as many positions as there are cylinder ports, means to successively rotate the valve to each of these positions to couple the pressure individually to said ports to change the angular direction of resultant movement of the slides, each given angle of rotation of the valve changing the direction of resultant movement through the same angle.

36. A tracer mechanism for a pattern controlled milling machine including a rotatable head, a tracer button mounted eccentrically on the head for movement relative to the axis thereof, means to adjust the axis of the tracer button relative to the axis of the rotatable head whereby the radial arm of the contact point of the button will equal the radius of the cutter associated therewith, said means including a micrometer screw, a micrometer gauge associated therewith, and power means controlled by the button in all positions of adjustment thereof for determining relative movement between the cutter and work.

37. An automatic pattern controlled die-sinking machine including a tracer and cutter, a work support movable in a plurality of angularly related directions with respect to the cutter, individual hydraulic motors for effecting relative movement therebetween, a source of pressure, a tracer controlled valve for coupling the pressure to said motors in such progressive relation that the resultant feed movement between cutter and work will be in an orbital path one about the other, and means to effect a continuous feed in a direction at right angles to the plane of said orbital movement whereby the die will be formed by one continuous spiral-like movement between cutter and work.

38. An automatic pattern controlled die-sinking machine including a tracer and cutter, a work support movable in a plurality of angularly related directions with respect to the cutter, individual hydraulic motors for effecting relative movement therebetween, a source of pressure, a rotatable tracer controlled valve for coupling the pressure to said motors in such progressive relation that the resultant feed movement between cutter and work will be in an orbital path one about the other, means to effect a continuous feed in a direction at right angles to the plane of said orbital movement whereby the die will be formed by one continuous spiral-like movement between cutter and work, a motor for effecting rotation of said valve, and means under the control of said tracer for effecting actuation of the motor.

39. An automatic pattern controlled die-sinking machine including a tracer and cutter, a work support movable in a plurality of angularly related directions with respect to the cutter, hydraulic motors for effecting said relative movement, a source of pressure, a rotatable tracer controlled valve for coupling the pressure to said motors in such progressive relation that the resultant feed movement between cutter and work will be in an orbital path one about the other, means to effect a continuous feed in a direction at right angles to the plane of said orbital movement whereby the die will be formed by one continuous spiral-like movement between cutter and work, a motor for effecting rotation of said valve, means under the control of said tracer for effecting actuation of the motor, and an adjustable double throttle valve interposed between the source of pressure and the tracer controlled valve for predetermining said feed rate.

40. An automatic pattern controlled die-sinking machine including a tracer and cutter, a work support movable in a plurality of angularly related directions with respect to the cutter, hydraulic motors for effecting the relative movement between cutter and work, a source of pressure, a rotatable tracer controlled valve for coupling the pressure to said motors in such progressive relation that the direction of the relative movement between cutter and work will be in an orbital path one about the other, means to effect a continuous feed in a direction at right angles to the plane of said orbital movement whereby the die will be formed by one continuous spiral-like movement between cutter and work, and dog actuated trip control means for discontinuing said feeding movement upon completion of the die-sinking movement.

41. An hydraulic pattern controlled milling machine comprising a column, a knee vertically movable on the column, a saddle translatable on the knee toward and from the column, a table slidably mounted upon the saddle for movement transversely thereof, a tracer and cutter supported by the column in operative relation to the table, hydraulic cylinders for effecting reciprocation of the table and saddle relative to the tracer and cutter, means for supporting the work and pattern on the table, an hydraulic pump mounted in the knee, a rotatable direction determining valve mounted on the column for determining the flow of fluid from the pump to said cylinders in such proportions as to determine the direction of relative movement between the cutter and work, a rotatable head for supporting the tracer, an hydraulic motor for effecting rotation of said head and of said directional control valve, indicia marks associated with the tracer head for indicating the direction of resultant feed movement, and means on the side of the column to control actuation of the pump and thereby operation of the machine.

42. In combination with an automatic pattern controlled machine tool, tracer mechanism comprising a rotatable tracer head and a tracer arm, the axis of rotation of which is eccentric to the axis of the tracer head.

43. In combination with an automatic pattern controlled machine tool, tracer mechanism comprising a tracer head and a tracer arm, and means to maintain the axes parallel when the tracer is out of contact with the pattern.

44. In combination with an automatic pattern controlled machine tool, tracer mechanism comprising a tracer head, a tracer arm having a pattern contacting portion, a pattern support, and means to rotate the tracer head during relative bodily movement between the pattern support and the head whereby the pattern will always contact the same side of said portion during operation of the machine.

45. In combination with an automatic pattern controlled machine tool, a tracer mechanism including a tracer arm having a pattern contacting portion, the diameter of which is different than the diameter of the cutter utilized therewith.

46. In combination with an automatic pattern controlled machine tool, tracer mechanism including a tracer head and a tracer arm, the axis of which is eccentric to the axis of the tracer head, and means to vary the amount of said eccentricity.

47. In combination with an automatic pattern controlled machine tool, tracer mechanism comprising a tracer head and a tracer arm, the axes of which are parallel when the tracer is out of contact with the pattern, and non-parallel when the tracer is in contact with the pattern.

48. In a pattern controlled machine tool, the combination of a tracer head having a stationary axis, and means in the head controlled by a pattern to cause the pattern to circumscribe the axis of the head in a substantially continuous movement.

49. In a pattern controlled machine tool having a tracer head, the axis of which is fixed, means carried by the head and controlled by the pattern to cause the pattern to circumscribe the axis of the head, and means to rotate the tracer head at the same rate that the pattern circumscribes said axis.

50. In a pattern controlled machine tool having a cutter and a tracer, the axes of which are fixed relative to one another, the combination of means controlled by the tracer to move a pattern and a work piece bodily about the axis of the tracer and cutter respectively without changing the orientation thereof.

51. In a pattern controlled machine tool having a cutter and a tracer, the axes of which are fixed relative to one another, the combination of means controlled by the tracer to move a pattern and a work piece bodily about the axis of the tracer and cutter respectively without changing the orientation thereof, and means to rotate the tracer at the same rate that the pattern moves about the tracer axis.

52. In a pattern controlled machine tool, the combination with a tracer deflectable a predetermined amount by a pattern to a normal machine controlling position, of power means for effecting relative approach between the pattern and tracer, and control means operatively connected for response to a slight initial deflection of the tracer as it touches the pattern to stop said approaching movement.

53. In a fluid control circuit for a pattern controlled machine tool having a tracer deflectable by a pattern to the normal working position, the combination of a first control valve for causing rapid approach of the tracer and pattern, and a second valve operable in response to initial deflection of the tracer for stopping said rapid movement and transferring subsequent control to the tracer.

54. In a pattern controlled machine tool having a trace and means to support a pattern, the combination of means for effecting automatic engagement of the tracer with the pattern including power means to feed the tracer toward the pattern, and control means automatically responsive as contact is established between the tracer and pattern to ease the tracer into proper controlled position with respect to said pattern.

55. In a fluid operable pattern controlled machine tool having a tracer and means to support a pattern, the combination of means for effecting automatic engagement of the tracer with the pattern including a first fluid circuit operative to effect a relative approach between the tracer and pattern at a relatively rapid rate, and a second control circuit including an engagement valve having a shiftable plunger, means creating a directional pressure differential on the plunger to position the same to effect operative coupling of the first circuit, and means operative upon slight deflection of the tracer to create a pressure differential having an opposite directional effect to disconnect said first circuit and connect said second circuit for operative control of the machine.

56. In a pattern controlled machine tool, the combination with a tracer head and a cutter, the axes of which are fixed, of power means to move the pattern and work about the tracer head and cutter respectively, power means to rotate the tracer head, and a common control for both of said power means effective to reduce the rate of pattern and work movement whenever the head is rotated.

57. In a pattern controlled machine tool having a tracer head and cutter mounted on fixed axes of a tracer arm carried by said head for contacting a pattern, power operable means to traverse the pattern and work about the tracer head and cutter, power operable means to rotate the tracer head, a common control for said power means, and means operatively coupling the tracer arm with said common control for reducing the rate of pattern and work movement whenever the tracer head is rotated.

58. In a pattern controlled machine tool having a tracer head and cutter mounted on fixed axes of a tracer arm carried by said head for contacting a pattern, power operable means to traverse the pattern and work about the tracer head and cutter, power operable means to rotate the tracer head, a common control for said power means, means operatively coupling the tracer arm with said common control for reducing the rate of pattern and work movement whenever the tracer head is rotated, and means responsive to rotation of the tracer head to change the direction of movement of the pattern and work with respect to the tracer and cutter.

59. In a pattern controlled machine tool having a rotatable tracer head and a pattern support movable about the tracer head of a fluid control circuit including a first control valve for determining the rate of operation of the machine, a second control valve for determining the proportional rates of operation of the tracer head and the pattern support, and a third control valve for determining the direction of movement of the pattern support, said control valves being serially connected in the order recited.

60. In a pattern controlled machine tool having a tracer and a pattern, the combination of means to cause one to move about the other in a continuous movement, and additional means to effect an indexing movement between the pattern and tracer in a direction normal to the plane of the first movement, said indexing movement being effected once for each revolution of one part about the other.

61. In a pattern controlled machine tool having a rotatable tracer head and a pattern support, the combination of a fluid operable motor for rotating said head, means to cause the pattern to move about the axis of the tracer head once for each revolution thereof, and means operatively connected to the tracer head motor to effect an indexing movement in a plane normal to the plane of movement of the pattern during each revolution of the tracer head.

62. A pattern controlled milling machine for reproducing work from a pattern comprising a cutter, a power circuit for controlling the direction of resultant feed movement between the cutter and the work including power actuable motors, a rotatable power distributing element therefor, a single power line connected to said element, means coupling the motors in parallel to said element for individual or simultaneous actuation, a tracer, means controlled by the tracer for rotatably positioning said element to couple the power line to either of said motors, or simultaneously to both of said motors, to effect a feed movement selectively in right angular paths or in the quadrantal paths, and means to decrease the feed rate whenever the direction of the movement is changed.

63. A pattern controlled machine tool for reproducing work from a pattern comprising a metal working tool, a plurality of supports for effecting relative movement between the work and tool, said supports having individual motors coupled thereto, a power circuit for controlling the direction of resultant tooling path effected by said supports including a source of pressure, a rotatable power distributing element, means coupling the motors in parallel to said element, a tracer contactible with a pattern, means controlled by the tracer including a reciprocable member for determining rotation of said power distributing element, said member having a neutral position to stop said rotation, and an operating position on either side thereof; and means to cause rotation of said power distributing element upon departure of said reciprocal element in either direction from its neutral position.

64. A tracer controlled mechanism for determining the direction of relative feed movement between a metal working tool and a work piece of a pattern controlled machine tool, comprising a rotatable tracer head having an eccentric universally movable tracer point adapted to contact the pattern, said tracer point being rotatable about the axis of said head to maintain the line of eccentricity perpendicular to the pattern at the point of contact therewith, a reciprocable power control element actuable by the tracer point upon deflection thereof by the pattern, said element being movable to a neutral position upon predetermined deflection of the tracer point to arrest rotation of the tracer head, means operated by the power control element upon departure from its neutral position to effect rotation of the tracer head in a direction tending to return the power control element to its neutral position, and means to increase the rate of rotation of the tracer head upon increase in said departure and simultaneously decrease the rate of relative feed between the tool and work.

65. A tracer mechanism for controlling the relative movement between a metal working tool and a work piece in a pattern controlled machine tool comprising a rotatable tracer head, an eccentric tracer button associated therewith, a reciprocable power control element operatively connected for response to deflection of the tracer button by engagement with the pattern, said element having a neutral position to which it is moved by a predetermined amount of deflection of the tracer, a motor for effecting rotation of the tracer head to maintain the eccentric arm of the tracer button with respect to the axis of the tracer head perpendicular to the tangent at the point of contact with the pattern, means actuable by the power control element upon movement in either direction from its neutral position to effect rotation of the tracer head, and additional means controlled by said element to reduce the rate of relative feed between the tool and work during rotation of said head.

66. A tracer mechanism for determining the rate and direction of relative movement between a metal working tool and a work piece in a pattern controlled machine tool whereby the work may be formed in accordance with a pattern, comprising a rotatable tracer head, a tracer arm supported thereby with its axis eccentric to the axis of the tracer head, a movable power control element operatively connected for actuation upon deflection of the tracer arm, said element having a neutral position to which it is moved by a predetermined amount of deflection of the tracer arm and in which position it causes a maximum rate of relative feed movement between the tool and work and simultaneously holds the tracer head at rest, a power operable motor for rotating the tracer head to maintain the radial arm to the point of contact between the tracer arm and the pattern perpendicular to the tangent to the pattern at that point, means actuable by the power control element upon movement to opposite sides of its neutral position by the tracer arm to effect rotation of the motor and thereby of the head in opposite directions, the direction being such as to tend to return the control element and the tracer arm to a neutral position, said last named means operating to increase the rate of rotation of the head upon increase in the amount of departure of the control element from its neutral position, and additional means simultaneously controlled by said element to inversely change the feed rate.

67. In a machine tool the combination of a tool for operating upon the work, a pair of supports for effecting relative movement between the work and the tool in a prescribed path, actuating motors for the supports, a power circuit for controlling said motors including means for determining the ratio of the relative rates of motor actuation during simultaneous operation thereof; or the rate of actuation of the individual motors during several operation thereof, a manually operable hand wheel for controlling said last named means, and a direction indicating means associated with said hand wheel whereby the direction of relative movement between the tool and work for each position of the hand wheel will be known to the operator.

68. A milling machine having a plurality of supports, fluid operable devices for actuating said supports, control means therefor including a rotatable member, a means for supplying fluid under pressure, means controlled by said rotatable member for determining the volumetric ratio of the fluid supplied to said devices and thereby the direction of resultant movement produced by said supports, and a hand wheel operatively connected to said rotatable member for varying the circumferential position thereof and thereby the direction of the resultant movement of said supports.

69. In a pattern controlled machine tool having a plurality of movable supports, fluid operable means for moving each of said supports, means for severally or simultaneously controlling said supports including a rotatable tracer head, and means operatively connected to the tracer head whereby each increment of angular movement of the tracer head will change the resultant direction of movement of the supports by the same incremental angle, a steering wheel operatively connected for rotation of the tracer head, and means associated with the tracer head for indicating the direction of said resultant movement.

70. In a pattern controlled machine tool having a rotatable tracer head and a pattern support the combination of a fluid operable motor for rotating said head, means controlled by head rotation to cause the pattern to move about the axis of the tracer head in a plane, and additional means operated by said motor for effecting a relative movement in a direction normal to said plane whereby a spiral path of relative movement is established between the pattern and the tracer head.

71. In a pattern controlled machine tool having a tracer head and a tool mounted on fixed axes, the combination of a tracer arm carried by said head for contacting a pattern, power operable means for effecting relative movement between a work piece and said tool in accordance with the pattern, power operable means controlled by the tracer to rotate said tracer head, and power distributing means including a rotatable valve member mounted co-axially of the tracer head and rotatable therewith for determining the proportional distribution of power to said power operable means whereby the resultant direction of movement produced thereby will be in accordance with the rotatable position of the tracer head.

72. In a pattern controlled machine tool having a rotatable tracer head and a pattern support, the combination of a tracer arm carried by said head, the axis of said tracer arm being eccentric to the axis of said head, power operable means controlled by the tracer arm for causing the pattern to move about the axis of the tracer head, and means to control rotation of the head in synchronism with said movement whereby the same side of the tracer arm will always be in contact with the pattern.

73. In a pattern controlled machine tool having a metal working tool and means to support a work piece in contact with said tool, the combination of means for controlling the direction of relative movement between the tool and work in accordance with a pattern including a tracer for contacting the pattern, power operable means controlled by the amount of tracer deflection for determining the direction of relative movement between the cutter and work and manually operable means for changing the tracer determined direction of said relative movement whereby disengagement may be effected between the tool and work.

74. In a milling machine the combination of a slideable carriage, a rotatable cutter carried by said carriage, a movable work table provided with a master, a tracer contacting the master, individual motors for actuating the carriage and the work table, individual flow channels for supplying fluid to said motors, the flow in said channels being inversely variable to control the relative rates of movement of the parts, a fluid control circuit for determining said flow including fluid operable means connected for joint or several adjustment of the individual flows, and a valve operatively connected to the tracer for controlling actuation of said fluid operable means and thereby the relative motion between said carriage and said work table to produce a cutting path in accordance with the outline of said master.

75. In a milling machine the combination of a slideable carriage, a rotatable cutter carried by said carriage, a movable work table provided with a master, a tracer contacting the master, individual motors for actuating the carriage and the work table, individual flow channels for supplying fluid to said motors, the flow in said channels being inversely variable to control the relative rates of movement of the parts, a fluid control circuit for determining said flow including fluid operable means connected for joint or several adjustment of the individual flows, a valve operatively connected to the tracer for controlling actuation of said fluid operable means and thereby the relative motion between said carriage and said work table to produce a cutting path in accordance with the outline of said master, and means to reduce the total flow to said channels when said fluid operable means are actuated.

76. The combination in an automatic profile milling machine of a pair of channels for determining relative movement between a cutter and a work piece, a first fluid operable mechanism for proportioning volumetric delivery in said channels to determine the resultant direction of said movement, a second mechanism for simultaneously varying the volumetric flow in said channels without disturbing the proportion therebetween, a tracer controlled mechanism operatively connected for controlling the first-named mechanism, and manually operable means operatively connected for controlling the second mechanism.

77. In a universal pattern controlled machine tool the combination with a power circuit for effecting relative movement in a profiling plane between a tool and work in similitude to relative movement between a tracer and pattern, of means in said circuit for effecting a movement vertical to said plane, including a control member having a manually operable handle for positioning said member in a neutral position for disconnecting the vertical feed mechanism, or to positions upon either side of the neutral position for selectively determining the direction of power feed movement in a vertical plane.

78. In a pattern controlled machine tool the combination with a power circuit for effecting uni-planar relative movement between a tool and work in a closed cutting path in similitude to such a relative movement between a tracer and pattern, and of means in said circuit for effecting a continuous relative movement between the tracer and pattern and thereby between the cutter and work in a direction normal to the plane whereby said closed cutting path will be transformed into a spiral cutting path so that three dimensional surfaces may be reproduced in a continuous cutting operation.

79. In a pattern controlled machine tool having a power circuit for effecting uni-planar relative movement between a tool and work the combination of means for controlling said movement whereby a die may be reproduced from a punch pattern, or vice versa, comprising a tracer head, a tracer arm, means to support the tracer arm on the head with its axis eccentric to the axis of the head and in such a manner that the point on the tracer arm which contacts the pattern lies between the axis of the tracer arm and the axis of the tracer head, the distance from the axis of the tracer head to said point being equal to the radius of the tool utilized therewith.

80. In combination with an automatic pattern controlled machine tool, a tracer mechanism comprising a rotatable tracer head, a tracer arm depending from the head and means to adjust the axis of the tracer arm eccentrically to the axis of rotation of the tracer head.

BERNARD SASSEN.
HANS ERNST.